(12) United States Patent
Fukumoto et al.

(10) Patent No.: US 8,406,109 B2
(45) Date of Patent: Mar. 26, 2013

(54) OPTICAL PICKUP APPARATUS

(75) Inventors: Satoru Fukumoto, Osaka (JP); Shinzoh Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/527,345

(22) Filed: Jun. 19, 2012

(65) Prior Publication Data

US 2013/0016597 A1   Jan. 17, 2013

(30) Foreign Application Priority Data

Jul. 15, 2011 (JP) .................... 2011-157239

(51) Int. Cl.
*G11B 7/00* (2006.01)

(52) U.S. Cl. ......... 369/112.03; 369/112.07; 369/112.12; 369/109.01

(58) Field of Classification Search ................. None
See application file for complete search history.

(56) References Cited

U.S. PATENT DOCUMENTS 5,544,143 A * 8/1996 Kay et al. ............. 369/112.07
6,137,752 A * 10/2000 Sakai .................... 369/44.23
6,144,623 A * 11/2000 Inoue et al. ............ 369/44.23
6,341,104 B1 * 1/2002 Yamaguchi et al. ..... 369/44.15

FOREIGN PATENT DOCUMENTS

JP    2007-287278    11/2007

* cited by examiner

*Primary Examiner* — Van Chow
(74) *Attorney, Agent, or Firm* — Nixon & Vanderhye, P.C.

(57) ABSTRACT

An optical pickup apparatus is provided. Segmented regions included in a focus diffraction region includes focus segmented regions corresponding in number with different light emitted by a light source. Different focus segmented regions are arranged adjacent to each other alternately in a direction perpendicular to a parallel dividing line. Segmented regions included in a tracking diffraction region includes tracking segmented regions corresponding in number with different light emitted by the light source. Different tracking segmented regions are arranged adjacent to each other alternately in a direction perpendicular to the parallel dividing line.

6 Claims, 12 Drawing Sheets

OPTICAL PICKUP APPARATUS

CROSS-REFERENCE TO RELATED APPLICATION

This application claims priority to Japanese Patent Application No. 2011-157239, which was filed on Jul. 15, 2011, the contents of which are incorporated herein by reference in its entirety.

BACKGROUND OF THE TECHNOLOGY

1. Field of the Technology

The present technology relates to an optical pickup apparatus that emits light to an optical recording medium and receives light reflected from the optical recording medium for performing recording or reproduction of information on the optical recording medium.

2. Description of the Related Art

As a related art, an optical pickup apparatus is described in Japanese Unexamined Patent Publication JP-A 2007-287278. The optical pickup apparatus, being designed to perform recording and reproduction of information on two different types of optical recording media, utilizes light of two different wavelengths, namely light of a first wavelength and light of a second wavelength. An example of the optical pickup apparatus based on this related art is shown in FIGS. 11, 12, 13A, 13B, and 14A to 14C.

FIG. 11 is a view showing one example of the structure of an optical pickup apparatus 120 of the related art. FIG. 12 is a plan view showing a diffractive element 121 and a light-receiving element 122 of the optical pickup apparatus 120. FIGS. 13A and 13B are plan views showing the diffractive element 121 and the light-receiving element 122 subjected to light.

FIG. 13A shows a state of receiving light of the first wavelength, and FIG. 13B shows a state of receiving light of the second wavelength. In the case of using the first wavelength, a spot 136 of light reflected from an optical recording medium 11 is displaced rightward from a spot 135 of light incident on the optical recording medium 11 from a light emission point 123. In the case of using the second wavelength, a spot 137 of light reflected from the optical recording medium 11 is displaced leftward from the light spot 135 incident on the optical recording medium 11 from the light emission point 123.

An emission wavelength from the light emission point 123 for the first-wavelength light is shorter than an emission wavelength from a light emission point 124 for the second-wavelength light. The angle of diffraction of a light beam 131 from the light emission point 123 for the first-wavelength light in the diffractive element 121 is smaller than the angle of diffraction of a light beam 132 from the light emission point 124 for the second-wavelength light in the diffractive element 121. With consideration given to the difference in diffraction angle, the light-receiving element 122 has light-receiving regions 18a to 18l arranged in three rows 125a to 125c.

The light beam 131 from the light emission point 123 for the first-wavelength light is incident on, among the light-receiving regions arranged in the three rows 125a to 125c, the light-receiving regions 18i and 18k belonging to the row 125a corresponding to a smaller diffraction angle, and also the light-receiving regions 18a to 18h belonging to the central row 125b. When electric signals outputted from the light-receiving regions 18a to 18l, respectively, are defined as Sa to Sl, respectively, a focus error signal (hereafter referred to as "FES") can be calculated in accordance with a formula of FES=(Sa+Sc)−(Sb+Sd).

A tracking error signal (hereafter referred to as "TES") can be detected by the three-beam method, the differential push pull method (hereafter referred to as "DPP method"), or the differential phase detection method (hereafter referred to as "DPD method").

When a tracking error signal obtained by the three-beam method, a tracking error signal obtained by the DPP method, and a tracking error signal obtained by the DPD method are represented as TES1, TES2, and TES3, respectively, these tracking error signals can be calculated in accordance with formulae of TES1=(Se+Sg)−(Sf+Sh); TES2=(Sa+Sb)−(Sc+Sd)−k((Se+Sf)−(Sg+Sh)); and TES3=ph((Sa+Sb)−(Sc+Sd)), respectively. In the equations, k represents a constant for correcting the difference in intensity between a main beam and a sub beam, and ph( ) represents computation of a phase component of each signal inside the parentheses. The main beam is zero-order diffraction light produced by a light-dividing element 130, whereas the sub beam is ±first-order diffraction light produced by the light-dividing element 130.

FIGS. 14A to 14C are views showing light spots of a main beam and two sub beams on the diffractive element 121. More specifically, in FIGS. 14A to 14C, there are shown light spots of a main beam and two sub beams reflected from the optical recording medium 11 in the case of adopting the three-beam method for use with the second-wavelength light. FIG. 14A shows a light spot 126 of one of the sub beams; FIG. 14B shows a light spot 128 of the main beam; and FIG. 14C shows a light spot 127 of the other one of the sub beams. A dividing line in each of the light spots 126, 127, and 128 corresponds to the projected dividing line of the diffractive element 121 shown in FIG. 13B. Sub beams which pass through, among individual regions obtained by dividing the entire area by the dividing lines of the diffractive element 121 shown in FIG. 13B, regions 19e, 19g, 19f, and 19h, respectively, are incident on the light-receiving regions 18e, 18g, 18f, and 18h, respectively. On the other hand, sub beams which pass through regions 19m, 19n, 19o, and 19p, respectively, are not incident on the light-receiving regions but incident on other regions than the light-receiving regions.

According to the related art, in the case of adopting the three-beam method for use with the second-wavelength light, among the three beams incident on the diffractive element 121, the light spots 126 and 127 of sub beams are displaced toward a plus side and a minus side, respectively, in a tangential direction Y. Moreover, a boundary between a region 17a and a region 17b, as well as a boundary between a region 17c and a region 17d, of the diffractive element 121 is displaced in a radial direction X. Such a displacement takes place due to a slight sub-beam rotation required to cause a sub beam spot which is incident on the optical recording medium 11 to enter a location displaced from a main beam spot by a distance equivalent to one-half of track width. When the dividing line of the diffractive element 121 is projected on the light spot of each beam, as shown in FIGS. 14A to 14C, the dividing line of the diffractive element 121 corresponding to the contour of the light spot 126, 127 of sub beam is displaced in the radial direction X and the tangential direction Y as well with respect to the dividing line of the diffractive element 121 corresponding to the contour of the light spot 128 of main beam.

Accordingly, under the three-beam method, the tracking error signal TES1 can be calculated in accordance with a formula of TES1=(Se+Sg)−(Sf+Sh) on the basis of the electric signals Se, Sf, Sg, and Sh derived from the light-receiving regions 18e, 18f, 18g, and 18h for receiving the sub beam of ±first-order diffraction light. However, due to the absence of light-receiving regions for receiving light beams passing through the regions 19m, 19n, 19o, and 19p, respectively, of the diffractive element 121, the light beams passing through the regions 19m, 19n, 19o, and 19p are not detected as electric signals. Furthermore, since the sum total of the areas of the regions 19e and 19g for receiving the light spot 126 of the sub beam of +(positive) first-order diffraction light differs from the sum total of the areas of the regions 19f and 19h for receiving the light spot 127 of the sub beam of − (negative) first-order diffraction light, it follows that variation in electric signal ratio occurs between the electric signal Se+Sg and the electric signal Sf+Sh. After all, the tracking error signal TES1 is brought into an unbalanced state; that is, deviates from the value at which equality in electric signal ratio is attained. This leads to the instability of tracking servo.

SUMMARY OF THE TECHNOLOGY

An object of the technology is to provide an optical pickup apparatus corresponding to a plurality of wavelengths, wherein, for the case with one of the wavelengths, lack of balance in tracking error signals under the three-beam method can be prevented, and, for the case with other wavelength, servo control is performed on the basis of tracking error signals under the DPD method or DPP method, with the consequent attainment of stable servo signals in either wavelength case.

The technology provides an optical pickup apparatus comprising:

a light source capable of emitting two or more types of light having different wavelengths to be applied to an optical recording medium having a plurality of tracks;

a light-receiving element having a focus light-receiving region for converting received light into electric signals for controlling a focal point of light emitted from the light source, and a tracking light-receiving region for converting received light into electric signals for exercising control in such a manner that light emitted from the light source is applied to a target track of the plurality of tracks of the optical recording medium; and a diffractive element having a diffraction region divided into a focus diffraction region for diffracting reflected light which is emitted from the light source and then reflected by the optical recording medium, in a direction toward the focus light-receiving region, and a tracking diffraction region for diffracting the reflected light in a direction toward the tracking light-receiving region, the focus diffraction region and the tracking diffraction region being divided into segmented regions by parallel dividing lines defined by a plurality of parallelly-arranged straight lines, the segmented regions included in the focus diffraction region being composed of focus segmented regions corresponding to different types of light that is emitted by the light source, the focus segmented regions corresponding to different light being arranged adjacent to each other in an alternating order in a direction perpendicular to the parallel dividing line, the segmented regions included in the tracking diffraction region being composed of tracking segmented regions corresponding to different types of light that is emitted by the light source, the tracking segmented regions corresponding to different light being arranged adjacent to each other in an alternating order in a direction perpendicular to the parallel dividing line, the focus diffraction region including focus regions corresponding to different types of light that is emitted by the light source, the tracking diffraction region including tracking regions corresponding to different types of light that is emitted by the light source, each of the focus regions being composed of focus segmented regions corresponding to light of a same type as that corresponding to the focus region, for diffracting the reflected light in a direction toward one and the same focus light-receiving region, each of the tracking regions being composed of tracking segmented regions corresponding to light of a same type as that corresponding to the tracking region, for diffracting the reflected light in a direction toward one and the same tracking light-receiving region, each of the focus segmented regions being so arranged as to lie next to the tracking segmented region corresponding to light of a same type as that corresponding to the focus segmented region at a boundary between the focus diffraction region and the tracking diffraction region.

The light source is capable of emitting two or more types of light having different wavelengths to be applied to an optical recording medium having a plurality of tracks. The light-receiving element has the focus light-receiving region for converting received light into electric signals for controlling a focal point of light emitted from the light source, and the tracking light-receiving region for converting received light into electric signals for exercising control in such a manner that light emitted from the light source is applied to a target track of the plurality of tracks of the optical recording medium. The diffractive element has the diffraction region divided into the focus diffraction region for diffracting reflected light which is emitted from the light source and then reflected by the optical recording medium, in a direction toward the focus light-receiving region, and the tracking diffraction region for diffracting the reflected light in a direction toward the tracking light-receiving region.

Moreover, the focus diffraction region and the tracking diffraction region are divided into segmented regions by the parallel dividing lines defined by a plurality of parallelly-arranged straight lines. The segmented regions included in the focus diffraction region are composed of the focus segmented regions corresponding to different types of light that is emitted by the light source. The focus segmented regions corresponding to different light are arranged adjacent to each other in an alternating order in a direction perpendicular to the parallel dividing line. The segmented regions included in the tracking diffraction region are composed of the tracking segmented regions corresponding to different types of light that is emitted by the light source. The tracking segmented regions corresponding to different light are arranged adjacent to each other in an alternating order in a direction perpendicular to the parallel dividing line. The focus diffraction region includes the focus regions corresponding to different types of light that is emitted by the light source. The tracking diffraction region includes the tracking regions corresponding to different types of light that is emitted by the light source.

Moreover, the focus regions are each composed of the focus segmented regions corresponding to light of the same type as that corresponding to the focus region, and diffract the reflected light in a direction toward one and the same focus light-receiving region. The tracking regions are each composed of the tracking segmented regions corresponding to light of the same type as that corresponding to the tracking region, and diffract the reflected light in a direction toward one and the same tracking light-receiving region. The focus segmented regions are each so arranged as to lie next to the tracking segmented region corresponding to light of the same type as that corresponding to the focus segmented region at the boundary between the focus diffraction region and the tracking diffraction region.

Thus, the optical pickup apparatus allows the shared use of the focus light-receiving region and the tracking light-receiving region for two or more types of light having different wavelengths. Moreover, the optical pickup apparatus is capable of performing tracking servo with stability by lessening inconsistency in intensity of sub beams incident on the focus region and the tracking region under the three-beam method. Accordingly, in the optical pickup apparatus corresponding to a plurality of different wavelengths, for the case with one of the wavelengths, lack of balance in tracking error signals under the three-beam method can be prevented, and, for the case with other wavelength, servo control is performed on the basis of tracking error signals under the DPD method or DPP method. Consequently, in either wavelength case, stable servo signals can be obtained.

Moreover, it is preferable that the diffraction region is divided into the focus diffraction region and the tracking diffraction region by a first dividing line defined by a straight line which is parallel to a recording surface of the optical recording medium and is perpendicular to a direction of a tangent to the track of the optical recording medium, and the parallel dividing line is inclined at a predetermined angle with respect to the first dividing line.

The diffraction region is divided into the focus diffraction region and the tracking diffraction region by the first dividing line defined by a straight line which is parallel to the recording surface of the optical recording medium and is perpendicular to the direction of the tangent to the track of the optical recording medium. The parallel dividing line is inclined at a predetermined angle with respect to the first dividing line. Accordingly, the optical pickup apparatus is able to suppress intrusion of noise into playback signals caused by foreign particles or dirt attached to the optical recording medium.

Moreover, it is preferable that the predetermined angle falls in a range of 30 degrees or more and 150 degrees or less.

The predetermined angle falls in the range of 30 degrees or more and 150 degrees or less. Accordingly, the optical pickup apparatus is able to reproduce playback signals with stability by suppressing intrusion of noise into optical signals in the presence of pits, namely concavities and convexities on the optical recording medium during the rotation of the optical recording medium.

Moreover, it is preferable that the segmented regions each have a plurality of diffraction grooves that are arranged parallelly and periodically, and when a single segmented region is sectioned along an imaginary plane perpendicular to the respective diffraction grooves, a number of the diffraction grooves included in the imaginary plane is five or more.

The segmented regions each have a plurality of diffraction grooves that are arranged parallelly and periodically. When a single segmented region is sectioned along an imaginary plane perpendicular to the respective diffraction grooves, the number of the diffraction grooves included in the imaginary plane is five or more. Thereby, in the optical pickup apparatus, the number of the diffraction grooves of each of the focus segmented regions and the tracking segmented regions arranged in a direction perpendicular to the diffraction grooves can be set at a necessary minimum value or more required for efficient diffraction. Accordingly, the optical pickup apparatus is able to achieve diffraction in each of the focus segmented regions and the tracking segmented regions with high efficiency.

Moreover, it is preferable that the tracking light-receiving region includes a first tracking light-receiving region and a second tracking light-receiving region disposed in a location different from the location of the first tracking light-receiving region, each of the tracking segmented regions includes at least one of a first diffraction region for diffracting part of the reflected light in a direction toward the first tracking light-receiving region and a second diffraction region for diffracting part of the reflected light in a direction toward the second tracking light-receiving region, the first diffraction region as well as the second diffraction region included in one and the same tracking segmented region is divided by at least one second dividing line defined by a straight line parallel to the direction of the tangent to the track of the optical recording medium, and an arrangement position of each second dividing line is determined according to a type of light corresponding to the tracking segmented region.

The tracking light-receiving region includes the first tracking light-receiving region and the second tracking light-receiving region disposed in a location different from the location of the first tracking light-receiving region. Each of the tracking segmented regions includes at least one of the first diffraction region for diffracting part of the reflected light in a direction toward the first tracking light-receiving region and the second diffraction region for diffracting part of the reflected light in a direction toward the second tracking light-receiving region. The first diffraction region as well as the second diffraction region included in one and the same tracking segmented region is divided by at least one second dividing line defined by a straight line parallel to the direction of the tangent to the track of the optical recording medium. The arrangement position of each second dividing line is determined according to a type of light corresponding to the tracking segmented region.

Thus, in the optical pickup apparatus, even if a plurality of light sources take different positions, this does not tip the balance of intensity of light incident on the first tracking light-receiving region and the second tracking light-receiving region more toward one side, namely either of the first tracking light-receiving region and the second tracking light-receiving region. Accordingly, the optical pickup apparatus is able to perform tracking servo with high accuracy.

Moreover, it is preferable that the tracking light-receiving region includes a plurality of light-receiving regions for receiving light diffracted in each of the tracking regions selectively in accordance with a type of light that is emitted by the light source.

The tracking light-receiving region includes a plurality of light-receiving regions for receiving light diffracted in each of the tracking regions selectively in accordance with a type of light that is emitted by the light source. Thereby, in the optical pickup apparatus, the size of the tracking light-receiving region can be reduced. Accordingly, the optical pickup apparatus is able to achieve an increase in responsivity for tracking servo.

BRIEF DESCRIPTION OF THE DRAWINGS

Other and further objects, features, and advantages of the technology will be more explicit from the following detailed description taken with reference to the drawings wherein.

DETAILED DESCRIPTION

Figure 1:
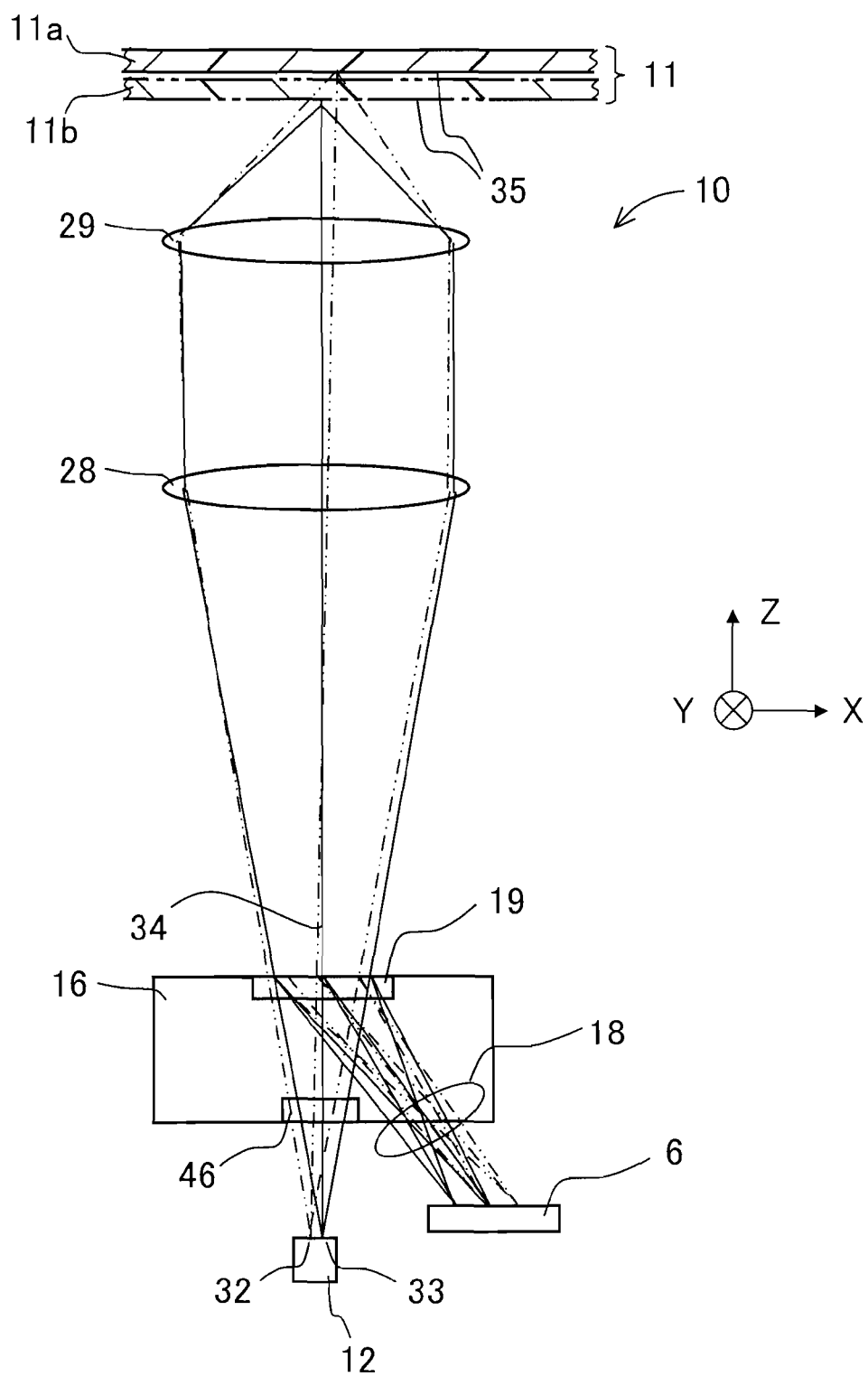
FIG. 1 is a view showing the structure of an optical pickup apparatus in accordance with a first embodiment.

Now referring to the drawings, preferred embodiments are described below.

Now refereeing to the drawings, a plurality of embodiments for implementing the technology will be described below. In the following description, constituent components of an embodiment corresponding to those that have been already described in the preceding embodiment will be identified with the same reference symbols, and overlapping explanation may be omitted. Where only a certain part of the construction of an embodiment is described, the rest part thereof will be deemed to be the same as that of the preceding embodiment. Not only it is possible to adopt a combination of specifically-described features of different embodiments, but it is also possible to combine different embodiments in part insofar as the combination poses no problem. Moreover, the following embodiments are considered as illustrative only of the technical features of the technology and are not intended to limit the technical scope of the technology. Hence, many changes and modifications may be made within the technical scope of the technology as expressed in the appended claims.

Figure 2:
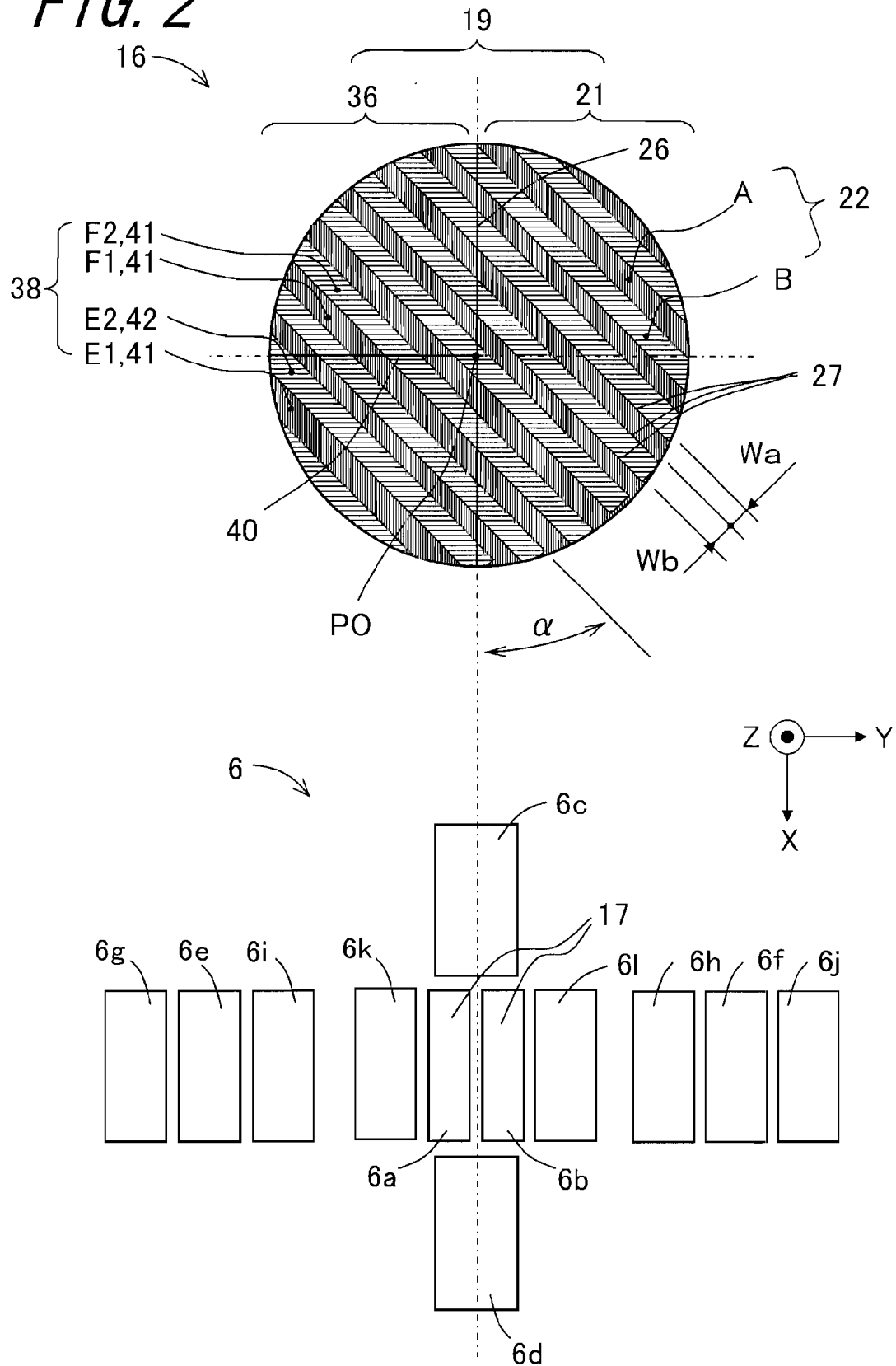
FIG. 2 is a plan view of a diffractive element and a light-receiving element.
Figure 3:
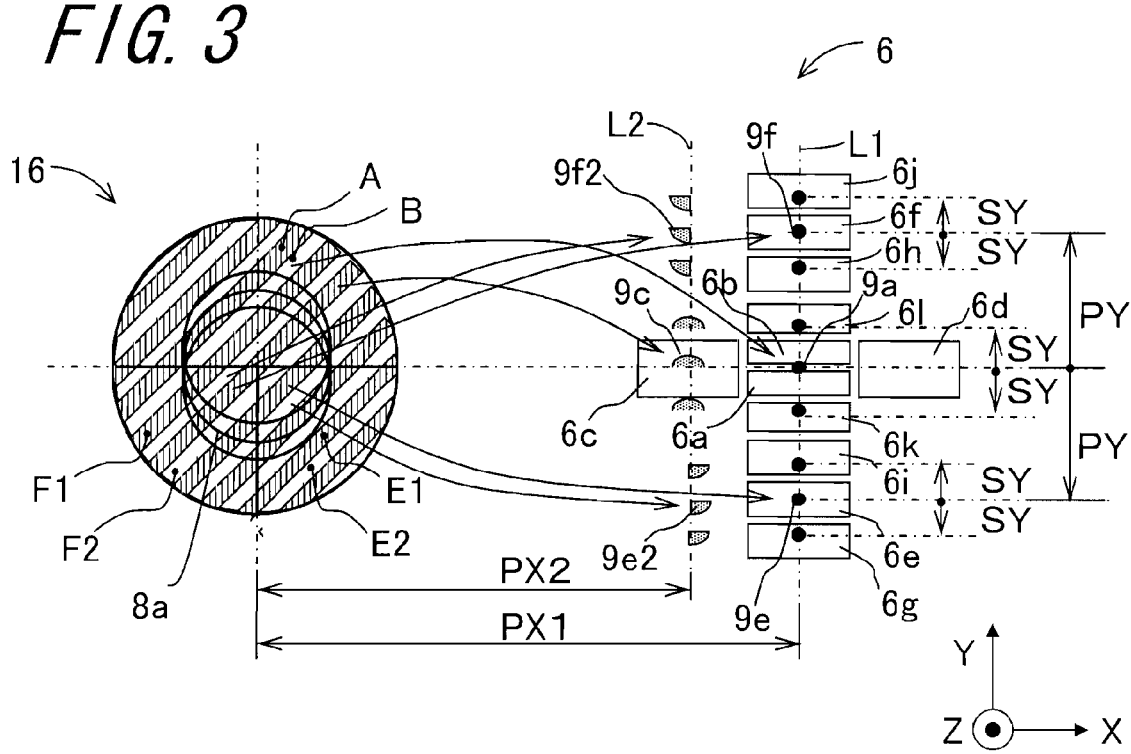
FIG. 3 is a view showing the relationship between the diffractive element and each light-receiving region for the case with light of a first wavelength.
Figure 4:
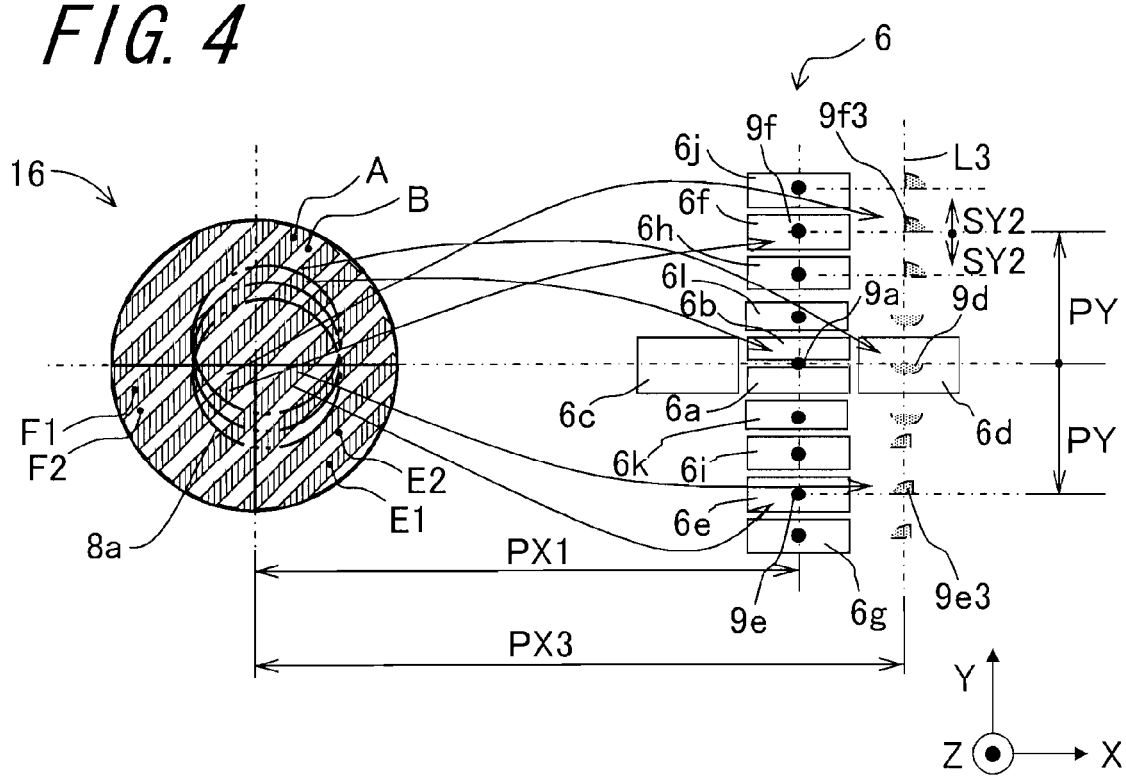
FIG. 4 is a view showing the relationship between the diffractive element and each light-receiving region for the case with light of a second wavelength.

FIG. 1 is a view showing the structure of an optical pickup apparatus 10 in accordance with a first embodiment. FIG. 2 is a plan view of a diffractive element 16 and a light-receiving element 6. FIG. 3 is a view showing the relationship between the diffractive element 16 and each light-receiving region for the case with light of a first wavelength. FIG. 4 is a view showing the relationship between the diffractive element 16 and each light-receiving region for the case with light of a second wavelength.

The optical pickup apparatus 10 is an apparatus designed to read information recorded on an optical recording medium 11 by applying light to the optical recording medium 11, causing reflected light 18 from the optical recording medium 11 to undergo positive first-order diffraction in a diffraction region 19, and receiving the resultant diffracted light. In FIGS. 1 and 2, the diffraction region 19 is divided into a plurality of regions by a plurality of dividing lines. The diffraction region 19 is divided into a focus diffraction region 21 and a tracking diffraction region 36 by a focus determination dividing line 26 serving as a first dividing line disposed so as to extend in a radial direction X while passing through a center point P0 of the diffraction region 19 (hereafter also referred to as "knife edge portion 26"), which will hereafter be described. FIG. 2 is a plan view showing the positional relation between the light-receiving element 6 and the diffractive element 16, with parallel dividing lines 27 extended at an angle of α with respect to the knife edge portion 26, as seen in a direction of an optical axis. The parallel dividing line 27 is a dividing line composed of a plurality of parallel straight line segments. FIGS. 3 and 4 are views showing the relationship between the diffractive element 16 of the optical pickup apparatus 10 and each light-receiving region at which light diffracted by the diffractive element 16 arrives.

The optical pickup apparatus 10 comprises a light source 12, a light-receiving element 6, the diffractive element 16, a collimator lens 28, and an objective lens 29. The diffractive element 16 includes a light-dividing element 46 for producing ±first-order diffraction light from incoming light from the light source 12, and the diffraction region 19 for directing reflected light from the optical recording medium 11 to the light-receiving element 6. The light source 12 is capable of emitting two or more types of light having different wavelengths. The light source 12 emits light which is applied to the optical recording medium 11. The light-receiving element 6 has a plurality of light-receiving regions for converting received light into electric signals. Part of the light-receiving regions is used as a focus light-receiving region 17. The focus light-receiving region 17 is used for focus servo. The focus servo is a control for focusing outgoing light emitted from the light source 12 onto a recording surface 35 of the optical recording medium 11.

The diffraction region 19 is implemented by using a hologram pattern. Positive first-order diffraction light, which results from diffraction of reflected light from the optical recording medium 11 effected by the diffraction region 19, is condensed on the light-receiving element 6.

The light-dividing element 46 is implemented by using a diffraction grating. In the light-dividing element 46, outgoing light from the light source 12 is divided into three light portions, namely zero-order diffraction light, positive first-order diffraction light, and negative first-order diffraction light (i.e., ±first-order diffraction light), thereby producing so-called three beams. That is, the light-dividing element 46 produces zero-order diffraction light serving as a main beam and ±first-order diffraction light serving as sub beams. The light-dividing element 46 is provided on the surface or in the interior of the diffractive element 16, and is located between the light source 12 and the diffraction region 19.

Outgoing light from the light source 12 that has passed through the light-dividing element 46 is condensed on a main track and a sub track of the optical recording medium 11. The light-dividing element 46 has a plurality of linear diffraction grooves. The diffraction groove of the light-dividing element 46 is provided perpendicularly to a straight line connecting an ideal light-condensing position for zero-order diffraction light on the main track with an ideal light-condensing position for ±first-order diffraction light on the sub track. The light-dividing element 46, like the diffractive element 16, can be constructed by a photolithography technique when a transparent glass substrate is employed, or photo polymerization method (2P method for short) or die molding technique when transparent resin is employed.

The diffractive element 16 receives the reflected light 18 from the optical recording medium 11. The diffractive element 16 has the diffraction region 19. The diffraction region 19 is divided into a plurality of regions. Part of the segmented regions is used as the focus diffraction region 21 for diffracting the reflected light 18 in a direction toward the light-receiving element 6. The focus diffraction region 21 causes at least part of the reflected light 18 to diffract in a direction toward the focus light-receiving region 17.

The focus diffraction region 21 includes different types of focus regions 22 that correspond in number with different types of light that is emitted by the light source 12. The focus regions 22 are differently configured to be adaptable to each of different light that is emitted by the light source 12. The different focus regions 22 diffract their respective ones of different light in a direction toward the focus light-receiving region 17. Moreover, the different focus regions 22 are each composed of a plurality of focus segmented regions which will hereafter be described. The focus segmented regions constituting each of the different focus regions 22 are so arranged as to be scattered over the focus diffraction region 21.

A predetermined part of the outer periphery of the focus diffraction region 21 is formed of the rectilinear focus determination dividing line 26. Irrespective of its light type, the reflected light 18 from the optical recording medium 11 intersects with the region for the incidence of the reflected light on the diffractive element 16; that is, intersects with the diffraction region 19. In other words, the reflected light 18 intersects with the diffraction region 19. The focus diffraction region 21 is divided into a plurality of focus segmented regions by a plurality of parallel dividing lines 27 arranged in parallel with each other. The parallel dividing lines 27 extend at a predetermined angle with respect to the knife edge portion 26.

The angle which the parallel dividing line 27 forms with the knife edge portion 26 falls in a range of 30 degrees or more and 150 degrees or less. The focus segmented regions each have a plurality of diffraction grooves that are arranged parallelly and periodically. In each focus segmented region, five or more diffraction grooves intersect with an imaginary plane intersecting perpendicularly with the diffraction grooves. That is, when the focus segmented region is sectioned along the imaginary plane perpendicular to the respective diffraction grooves, the number of the diffraction grooves included in the plane of section is five or more.

The optical recording medium 11 is a recording medium capable of effecting recording or reproduction of information in an optical manner. For example, the optical recording medium 11 is constructed of a compact disk (CD for short), a digital versatile disk (DVD for short), a Blu-ray disk (BD for short: registered trademark), or the like.

The optical pickup apparatus 10 is capable of effecting recording and reproduction of information on any two of the optical recording media 11 of different types as described just above. In the case of employing CD for the optical recording medium 11, light having a wavelength in the vicinity of 780 nm in an infrared range is used. In the case of employing DVD for the optical recording medium 11, red light having a wavelength in the vicinity of 650 nm is used. In the case of employing BD for the optical recording medium 11, bluish-violet light having a wavelength in the vicinity of 405 nm is used. The optical recording medium 11 may be of a recording medium having an even higher capacity with a stack of a plurality of recording layers.

For the sake of performing at least one of recording and reproduction on a plurality of optical recording media 11, the light source 12 for emitting light of two or three different wavelengths is disposed inside a single optical pickup apparatus 10. In FIG. 1, there are shown both of the case of using an optical recording medium 11a as one of the different optical recording media 11 and the case of using an optical recording medium 11b as the other corresponding to a wavelength different from the wavelength corresponding to the optical recording medium 11a. The optical pickup apparatus 10 performs reproduction and recording of information by applying light, for example laser light from the light source 12 to the recording surface 35 of the optical recording medium 11, and receiving the resultant reflected light on the light-receiving region of the light-receiving element 6.

The optical pickup apparatus 10 effects conversion of light received by the light-receiving region on the light-receiving element 6 from an optical signal to an electric signal to detect a servo signal for performing focus servo and tracking servo on the optical recording medium 11. The tracking servo is a control for applying outgoing light emitted from the light source 12 to, among tracks on the recording surface 35 of the optical recording medium 11, a target track used for recording or reproduction. In response to the detected servo signal, the optical pickup apparatus 10 effects focus servo and tracking servo. In focus servo, for example, the knife edge method or the astigmatic method is employed. On the other hand, in tracking servo, for example, the differential phase detection (hereafter referred to as "DPD") method or the three-beam method is employed, depending on a type of the optical recording medium 11.

The collimator lens 28 turns light emitted from the light source 12 into parallel light. The objective lens 29 condenses a light beam in the form of parallel light from the collimator lens 28 on the optical recording medium 11. The objective lens 29 is supported by a non-illustrated actuator.

The light source 12 is constructed for example of a semiconductor laser element. The light source 12 has two light emission points, namely a first light emission point 32 for emitting light of the first wavelength and a second light emission point 33 for emitting light of the second wavelength. Light of the first wavelength and light of the second wavelength exit from the first light emission point 32 and the second light emission point 33, respectively, in substantially the same direction. Of the two different wavelengths, the shorter one is defined as the first wavelength, and the longer one is defined as the second wavelength.

The optical pickup apparatus 10 employs, as the semiconductor laser element, a monolithic element in which light emission points for emitting light of different wavelengths are provided in a single chip. However, the semiconductor laser element is not so limited, but may be of a hybrid element in which two chips each corresponding to laser light of a single wavelength are arranged close to each other.

In the optical pickup apparatus 10, the optical axes of a plurality of optical components for directing outgoing light from the light source 12 to the optical recording medium 11 are aligned on a single straight line. The optical components include the light source 12, the light-dividing element 46, the diffraction region 19, the collimator lens 28, and the objective lens 29. Hereinafter, a direction axially of outgoing light from the first light emission point 32 will be termed "optical-axis direction Z". The optical-axis direction Z refers to a Z direction of an XYZ coordinate system. The optical-axis direction Z lies so as to pass through the centers, respectively, of the objective lens 29 and the collimator lens 28. FIGS. 3 and 4 show the diffractive element 16 and the light-receiving element 6 as viewed in the optical-axis direction Z.

The collimator lens 28 and the objective lens 29 condense outgoing light from the light source 12 on the recording surface 35 of the optical recording medium 11. A light converging point on the recording surface 35 of the optical recording medium 11 is located on the track provided on the recording surface 35. The direction of a line tangent to the light converging point on the track will be termed "tangential direction Y". Moreover, a direction with respect to the diffractive element 16 and the light-receiving element 6 corresponding to the direction of a line tangent to the light converging point on the track will also be described as the "tangential direction Y". Further, a direction which is perpendicular to the optical-axis direction Z as well as to the tangential direction Y will be termed "radial direction X". In what follows, the tangential direction Y refers to a Y direction of the XYZ coordinate system, and the radial direction X refers to an X direction of the XYZ coordinate system.

The light-receiving element 6 is spaced from the light source 12 in the radial direction X. When the radial direction X is defined by two opposite radial directions, one radial direction X from the light-receiving element 6 toward the light source 12 will be termed "negative direction" (hereafter referred to as "– direction"), and the other radial direction X opposite to –X direction will be termed "positive direction" (hereafter referred to as "+ direction").

The light-receiving element 6 has 12 light-receiving regions, namely the first to twelfth light-receiving regions 6a to 6l. In the light-receiving element 6, light of the first wavelength is received by the third light-receiving region 6c, and light of the second wavelength is received by the fourth light-receiving region 6d. In the light-receiving element 6, light of the first and second wavelengths is received by 10 light-receiving regions, namely the first, second, and fifth to tenth light-receiving regions 6a, 6b, 6e, 6f, 6g, 6h, 6i, 6j, 6k, and 6l. Among the first to twelfth light-receiving regions 6a to 6l, the first light-receiving region 6a and the second light-receiving region 6b are adjacent to each other in the tangential direction Y. The optical signals of light convergently incident on the first and second light-receiving regions 6a and 6b are used for focus servo. Disposed next to one side of the first, second light-receiving region 6a, 6b toward the – direction of the radial direction X is the third light-receiving region 6c, and disposed next to the other side of the first, second light-receiving region 6a, 6b toward the + direction of the radial direction X is the fourth light-receiving region 6d. The third light-receiving region 6c and the fourth light-receiving region 6d are each situated at the same location as the first and second light-receiving regions 6a and 6b as seen in the tangential direction Y.

The fifth and sixth light-receiving regions 6e and 6f are spaced by a distance PX1 from an optical axis 34 for outgoing light from the first light emission point 32 of the light source 12 toward the + direction of the radial direction X. The fifth light-receiving region 6e is situated at a location spaced by a distance PY toward the – direction of the tangential direction Y, and the sixth light-receiving region 6f is situated at a location spaced by a distance PY toward the + direction of the tangential direction Y. Disposed next to one side of the fifth light-receiving region 6e toward the – direction of the tangential direction Y is the seventh light-receiving region 6g, and disposed next to the other side of the fifth light-receiving region 6e toward the + direction of the tangential direction Y is the ninth light-receiving region 6i. Disposed next to one side of the sixth light-receiving region 6f toward the – direction of the tangential direction Y is the eighth light-receiving region 6h, and disposed next to the other side of the sixth light-receiving region 6f toward the + direction of the tangential direction Y is the tenth light-receiving region 6j. Disposed next to one side of the first light-receiving region 6a toward the – direction of the tangential direction Y is the eleventh light-receiving region 6k. Disposed next to one side of the second light-receiving region 6b toward the + direction of the tangential direction Y is the twelfth light-receiving region 6l.

The first light-receiving region 6a and the second light-receiving region 6b are identical in dimension in the radial direction X. The third and fourth light-receiving regions 6c and 6d are substantially equal in radial direction X-wise dimension to the first and second light-receiving regions 6a and 6b, or are so designed that the third light-receiving region 6c is smaller in radial direction X-wise dimension than the first, second light-receiving region, whereas the fourth light-receiving region 6d is larger in radial direction X-wise dimension than the first, second light-receiving region. The fifth to twelfth light-receiving regions 6e to 6l are equal in radial direction X-wise dimension to the first and second light-receiving regions 6a and 6b.

The third to twelfth light-receiving regions 6c to 6l are substantially identical in dimension in the tangential direction Y. The tangential direction Y-wise dimension of the first, second light-receiving region 6a, 6b is substantially one-half of that of each of the third to twelfth light-receiving regions. An imaginary straight line extending in the radial direction X while passing through the center of each of the third and fourth light-receiving regions 6c and 6d in the tangential direction Y passes midway between the first light-receiving region 6a and the second light-receiving region 6b.

The ends in the – direction of the radial direction X of the first, second, and fifth to twelfth light-receiving regions 6a, 6b, and 6e to 6l are substantially aligned on a single straight line extending in the tangential direction Y. The four light-receiving regions, namely the first, second, fifth, and sixth light-receiving regions 6a, 6b, 6e, and 6f receive zero-order diffraction light of the first and second wavelengths produced by the light-dividing element 46. The third light-receiving region 6c receives zero-order diffraction light of the first wavelength produced by the light-dividing element 46, and the fourth light-receiving region 6d receives zero-order diffraction light of the second wavelength produced by the light-dividing element 46. The seventh light-receiving region 6g receives negative first-order diffraction light of the first and second wavelengths produced by the light-dividing element 46, and the eighth light-receiving region 6h receives negative first-order diffraction light of the first and second wavelengths produced by the light-dividing element 46. The ninth light-receiving region 6i receives positive first-order diffraction light of the first and second wavelengths produced by the light-dividing element 46, and the tenth light-receiving region 6j receives positive first-order diffraction light of the first and second wavelengths produced by the light-dividing element 46. The eleventh light-receiving region 6k receives negative first-order diffraction light of the first and second wavelengths produced by the light-dividing element 46, and the twelfth light-receiving region 6l receives positive first-order diffraction light of the first and second wavelengths produced by the light-dividing element 46.

The diffraction region 19 diffracts the reflected light 18 from the optical recording medium 11 in a direction toward the first to twelfth light-receiving regions 6a to 6l for signal detection. The diffraction region 19 has a diffraction grating. The diffraction grating is composed of diffraction grooves. When the diffraction region 19 is viewed in the optical-axis direction Z, the diffraction region 19 has a circular outer shape, the center point P0 of which lies in a location passing through the optical axis 34 of the optical pickup apparatus 10.

The diffraction region 19 is divided into a plurality of regions by a plurality of dividing lines. One of the dividing lines is the focus determination dividing line 26 disposed so as to extend in the radial direction X while passing through the center point P0 of the diffraction region 19, namely the knife edge portion 26. The diffraction region 19 is divided into the focus diffraction region 21 and the tracking diffraction region 36 by the knife edge portion 26. One side of the diffraction region 19 toward the + direction of the tangential direction Y with respect to the knife edge portion 26 is the focus diffraction region 21, and the other side thereof toward the − direction of the tangential direction Y with respect to the knife edge portion 26 is the tracking diffraction region 36. The focus diffraction region 21 and the tracking diffraction region 36 can be arranged in the place of each other with respect to the knife edge portion 26 as a symmetrical axis.

Each of the focus diffraction region 21 and the tracking diffraction region 36 has a semicircular shape. The tracking diffraction region 36 is divided into a first tracking region E and a second tracking region F by a tracking determination dividing line 40 (hereafter also referred to as "tracking dividing line 40"). The tracking determination dividing line 40 serving as a second dividing line is disposed so as to extend in the tangential direction Y while passing through the center point P0. Each of the first tracking region E and the second tracking region F has the shape of a sector defined by part of the perimeter of a circle whose center coincides with the center point P0 and two radial lines, which are straight lines intersecting at right angles with respect to the center point P0.

As has already been described, the focus diffraction region 21 is divided into a plurality of focus regions 22 that correspond in number with different types of light that is emitted by the light source 12. In the first embodiment, the focus diffraction region 21 is divided into a plurality of strip-like focus segmented regions by a plurality of parallel dividing lines 27 within the range of the semicircle defining the contour of the focus diffraction region 21. The parallel dividing lines 27 are each inclined at an angle of a with respect to the knife edge portion 26, and are of a plurality of Wa-wide straight lines and Wb-wide straight lines arranged parallelly in an alternating order.

Part of a plurality of focus segmented regions constitutes a first focus region A, and the rest constitutes a second focus region B. In the first embodiment, since the light source 12 emits two different types of light, it follows that the first focus region A serves as one light-specific focus region 22, and the second focus region B serves as the other light-specific focus region 22.

The first focus region A is composed of a plurality of focus segmented regions surrounded by all of, or one of two parallel dividing lines 27 constituting Wa-wide parallel lines, an arc defining the outer periphery of the diffraction region 19, and the knife edge portion 26. The second focus region B is composed of a plurality of focus segmented regions surrounded by all of, or one of two parallel dividing lines 27 constituting Wb-wide parallel lines, the arc defining the outer periphery of the diffraction region 19, and the knife edge portion 26.

The focus segmented regions constituting the first focus region A and the focus segmented regions constituting the second focus region B are arranged alternately in a direction perpendicular to the parallel dividing line 27. In this way, the focus segmented regions constituting the first focus region A and the focus segmented regions constituting the second focus region B are periodically scattered within the focus diffraction region 21. Accordingly, the edge of each of the focus segmented regions lying within the first and second focus regions A and B is defined by all of, or one of two parallel dividing lines 27, the knife edge portion 26, and the arc defining the outer periphery of the diffraction region 19.

The first focus region A has a diffraction grating for condensing incident light of the first wavelength on the boundary between the first light-receiving region 6a and the second light-receiving region 6b of the light-receiving element 6. The second focus region B has a diffraction grating for condensing incident light of the second wavelength on the boundary between the first light-receiving region 6a and the second light-receiving region 6b of the light-receiving element 6.

The tracking diffraction region 36 is a semicircular region which is one side of the diffraction region toward the − direction of the tangential direction Y with respect to the knife edge portion 26. The tracking diffraction region 36 is divided into a first-type tracking diffraction region 41 and a second-type tracking diffraction region 42. The first-type tracking diffraction region 41 is provided as a diffraction grating for diffracting incident light of the first wavelength in a direction toward a tracking light-receiving region which will hereafter be described, and the second-type tracking diffraction region 42 is provided as a diffraction grating for diffracting incident light of the second wavelength in a direction toward the tracking light-receiving region. The first-type tracking diffraction region 41 and the second-type tracking diffraction region 42 are each divided into two regions by the tracking determination dividing line 40.

The tracking diffraction region 36 is further divided into the first tracking region E and the second tracking region F by the tracking determination dividing line 40. The first tracking region E and the second tracking region F are each divided into different tracking regions 38 that correspond in number with different types of light that is emitted by the light source 12. In the first embodiment, two types of tracking regions 38 are provided in each of the tracking regions E and F. The tracking regions 38 included in the first tracking region E are a first first-type tracking region E1 and a second first-type tracking region E2. The tracking regions 38 included in the second tracking region F are a first second-type tracking region F1 and a second second-type tracking region F2.

The first tracking region E and the second tracking region F are divided into a plurality of strip-like tracking segmented regions by the parallel dividing lines 27. The tracking segmented regions are separated by the tracking determination dividing line 40 serving as the boundary between the first tracking region E and the second tracking region F. A single tracking segmented region lying in straddle fashion between the first tracking region E and the second tracking region F is divided into a tracking segmented region included in the first tracking region E and a tracking segmented region included in the second tracking region F by the tracking determination dividing line 40. Hereinafter, the focus segmented region and the tracking segmented region will be collectively called "segmented region".

The first first-type tracking region E1 is composed of, among a plurality of tracking segmented regions included in the first tracking region E, two or more tracking segmented regions surrounded by one of two parallel dividing lines 27 constituting Wa-wide parallel lines, the arc defining the outer periphery of the diffraction region 19, the tracking determination dividing line 40, and the focus determination dividing line 26. The second first-type tracking region E2 is composed of, among a plurality of tracking segmented regions included in the first tracking region E, two or more tracking segmented regions surrounded by one of two parallel dividing lines 27 constituting Wb-wide parallel lines, the arc defining the outer periphery of the diffraction region 19, the tracking determination dividing line 40, and the focus determination dividing line 26.

Moreover, the first second-type tracking region F1 is composed of, among a plurality of tracking segmented regions included in the second tracking region F, two or more tracking segmented regions surrounded by one of two parallel dividing lines 27 constituting Wa-wide parallel lines, the arc defining the outer periphery of the diffraction region 19, the tracking determination dividing line 40, and the focus determination dividing line 26. The second second-type tracking region F2 is composed of, among a plurality of tracking segmented regions included in the second tracking region F, two or more tracking segmented regions surrounded by one of two parallel dividing lines 27 constituting Wb-wide parallel lines, the arc defining the outer periphery of the diffraction region 19, the tracking determination dividing line 40, and the focus determination dividing line 26.

That is, in the first tracking region E and the second tracking region F, any one of the different tracking regions 38 is composed of a plurality of tracking segmented regions. The first first-type tracking region E1 and the first second-type tracking region F1 are corresponding to one light, and the second first-type tracking region E2 and the second second-type tracking region F2 are corresponding to the other light.

The first first-type tracking region E1, the second first-type tracking region E2, the first second-type tracking region F1, and the second second-type tracking region F2 are periodically scattered in a direction perpendicular to the parallel dividing line 27. The first first-type tracking region E1, the first second-type tracking region F1, and the first focus region A, while straddling the focus determination dividing line 26 and the tracking determination dividing line 40, are defined by the continuous parallel dividing lines 27. Similarly, the second first-type tracking region E2, the second second-type tracking region F2, and the second focus region B, while straddling the focus determination dividing line 26 and the tracking determination dividing line 40, are defined by the continuous parallel dividing lines 27.

The tracking segmented regions included in the first tracking region E and the tracking segmented regions included in the second tracking region F are so arranged that one light-specific tracking segmented regions are adjacent to each other in the radial direction X on the tracking determination dividing line 40. As will hereafter be described in detail, by virtue of such an arrangement, optical signals detected in the light-receiving regions for receiving light diffracted by the first tracking region E and the second tracking region F are converted into electric signals and, on the basis of differential between the electric signals, detection of a tracking error signal can be achieved.

The first wavelength is represented as "$\lambda 1$", and the second wavelength is represented as "$\lambda 2$". The angle of incidence of light of the first wavelength on the first focus region A is represented as "$\theta A1i$", and the diffraction angle of positive first-order diffraction light resulting from diffraction of the incident light is represented as "$\theta A1d$". The angle of incidence of light of the second wavelength on the first focus region A is represented as "$\theta A2i$", and the diffraction angle of positive first-order diffraction light resulting from diffraction of the incident light is represented as "$\theta A2d$". The angle of incidence of light of the first wavelength on the second focus region B is represented as "$\theta B1i$", and the diffraction angle of positive first-order diffraction light resulting from diffraction of the incident light is represented as "$\theta B1d$". The angle of incidence of light of the second wavelength on the second focus region B is represented as "$\theta B2i$", and the diffraction angle of positive first-order diffraction light resulting from diffraction of the incident light is represented as "$\theta B2d$". The angle of incidence refers to an angle of incident light with respect to the optical axis 34.

Moreover, when the pitch of diffraction grooves provided in the first focus region A is represented as "dA" and the pitch of diffraction grooves provided in the second focus region B is represented as "dB", the following formula (1) holds for the first-wavelength light incident on the first focus region A; the following formula (2) holds for the first-wavelength light incident on the second focus region B; the following formula (3) holds for the second-wavelength light incident on the first focus region A; and the following formula (4) holds for the second-wavelength light incident on the second focus region B.

$$\sin \theta A1i - \sin \theta A1d = \lambda 1/dA \tag{1}$$

$$\sin \theta B1i - \sin \theta B1d = \lambda 1/dB \tag{2}$$

$$\sin \theta A2i - \sin \theta A2d = \lambda 2/dA \tag{3}$$

$$\sin \theta B2i - \sin \theta B2d = \lambda 2/dB \tag{4}$$

Three circles as seen in the diffractive element 16 shown in FIGS. 3 and 4 represent light spots that appear upon the incidence of reflected light from the optical recording medium 11 on the diffraction region 19. As shown in FIG. 3, when zero-order diffraction light of the first wavelength produced by the light-dividing element 46 is incident on the first focus region A of the diffraction region 19, the zero-order diffraction light diffracted in the first focus region A is condensed, as a convergent light spot 9a, on a location spaced by the distance PX1 from the optical axis 34 for outgoing light from the first light emission point 32 of the light source 12 toward the + direction of the radial direction X. A straight line, which extends in the tangential direction Y while passing through the location of the convergent light spot 9a spaced by the distance PX1 from the optical axis 34 for outgoing light from the first light emission point 32 of the light source 12 toward the + direction of the radial direction X on the light-receiving surface of the light-receiving element 6, will be termed "first straight line L1".

The convergent light spot 9a on the light-receiving surface of the light-receiving element 6 is condensed in a dot or nearly dot form on the boundary between the first light-receiving region 6a and the second light-receiving region 6b. On the light-receiving surface of the light-receiving element 6, the first straight line L1 passes through the first, second, and fifth to twelfth light-receiving regions 6a, 6b, and 6e to 6l.

When negative first-order diffraction light of the first wavelength produced by the light-dividing element 46 is incident on the first focus region A of the diffraction region 19, the negative first-order diffraction light diffracted in the first focus region A is condensed on a location within the eleventh light-receiving region 6k spaced by a distance of SY from the convergent light spot 9a, which results from convergence of the zero-order diffraction light diffracted in the first focus region A, toward the − direction of the tangential direction Y. When positive first-order diffraction light of the first wavelength produced by the light-dividing element 46 is incident on the first focus region A, the positive first-order diffraction light diffracted in the first focus region A is condensed on a location within the twelfth light-receiving region 6l spaced by the distance SY from the convergent light spot 9a toward the + direction of the tangential direction Y.

When zero-order diffraction light of the first wavelength is incident on the second focus region B of the diffraction region 19, the zero-order diffraction light diffracted in the second focus region B is condensed, as a convergent light spot 9c, on a location spaced by a distance of PX2 from the optical axis 34 for outgoing light from the first light emission point 32 of the light source 12 toward the + direction of the radial direction X. The distance PX2 is shorter than the distance PX1. A straight line, which extends in the tangential direction Y while passing through the location of the convergent light spot 9c spaced by the distance PX2 from the optical axis 34 for outgoing light from the first light emission point 32 of the light source 12 on the light-receiving surface of the light-receiving element 6, will be termed "second straight line L2". The convergent light spot 9c on the third light-receiving region 6c, which results from diffraction of the first-wavelength light in the second focus region B, is slightly larger in spot shape than the convergent light spot 9a on the boundary between the first light-receiving region 6a and the second light-receiving region 6b, which results from diffraction of the first-wavelength light in the first focus region A.

When negative first-order diffraction light of the first wavelength produced by the light-dividing element 46 is incident on the second focus region B of the diffraction region 19, the negative first-order diffraction light diffracted in the second focus region B is condensed on a location spaced by the distance SY from the convergent light spot 9c, which results from convergence of the zero-order diffraction light diffracted in the second focus region B, toward the − direction of the tangential direction Y. When positive first-order diffraction light of the first wavelength produced by the light-dividing element 46 is incident thereon, the positive first-order diffraction light diffracted in the second focus region B is condensed on a location spaced by the distance SY from the convergent light spot 9c, which results from convergence of the zero-order diffraction light diffracted in the second focus region B, toward the + direction of the tangential direction Y. The shape of each of the resultant convergent light spots is slightly larger than the shape of the convergent light spot 9c.

Likewise, in the tracking diffraction region 36, when zero-order diffraction light of the first wavelength produced by the light-dividing element 46 is incident on the first first-type tracking region E1, the zero-order diffraction light diffracted in the first first-type tracking region E1 is condensed, as a convergent light spot 9e in a dot or nearly dot form, on a location spaced by the distance PX1 from the optical axis 34 for outgoing light from the first light emission point 32 of the light source 12 toward the + direction of the radial direction X, as well as spaced by a distance of PY toward the − direction of the tangential direction Y. When zero-order diffraction light of the first wavelength produced by the light-dividing element 46 is incident on the first second-type tracking region F1, the zero-order diffraction light diffracted in the first second-type tracking region F1 is condensed, as a convergent light spot 9f in a dot or nearly dot form, on a location spaced by the distance PX1 from the optical axis 34 for outgoing light from the first light emission point 32 of the light source 12 toward the + direction of the radial direction X, as well as spaced by the distance PY toward the + direction of the tangential direction Y. Where the relationship between the pitch of diffraction grooves and the diffraction angle is concerned, formulae similar to those that have already been described in connection with the first and second focus regions A and B hold true. Therefore, the description thereof will be omitted to avoid overlap.

When negative first-order diffraction light of the first wavelength produced by the light-dividing element 46 is incident on the first first-type tracking region E1, the negative first-order diffraction light diffracted in the first first-type tracking region E1 is condensed on a location within the seventh light-receiving region 6g spaced by the distance SY from the convergent light spot 9e, which results from zero-order diffraction in the first first-type tracking region E1, toward the − direction of the tangential direction Y. When positive first-order diffraction light of the first wavelength produced by the light-dividing element 46 is incident on the first first-type tracking region E1, the positive first-order diffraction light diffracted in the first first-type tracking region E1 is condensed, in a dot or nearly dot form, on a location within the ninth light-receiving region 6i spaced by the distance SY from the convergent light spot 9e, which results from diffraction in the first first-type tracking region E1, toward the + direction of the tangential direction Y.

When negative first-order diffraction light of the first wavelength produced by the light-dividing element 46 is incident on the first second-type tracking region F1, the negative first-order diffraction light diffracted in the first second-type tracking region F1 is condensed on a location within the eighth light-receiving region 6h spaced by the distance SY from the convergent light spot 9f, which results from zero-order diffraction in the first second-type tracking region F1, toward the − direction of the tangential direction Y. When positive first-order diffraction light of the first wavelength produced by the light-dividing element 46 is incident on the first second-type tracking region F1, the positive first-order diffraction light diffracted in the first second-type tracking region F1 is condensed, in a dot or nearly dot form, on a location within the tenth light-receiving region 6j spaced by the distance SY from the convergent light spot 9f, which results from diffraction in the first second-type tracking region F1, toward the + direction of the tangential direction Y.

When zero-order diffraction light of the first wavelength produced by the light-dividing element 46 is incident on the second first-type tracking region E2, the zero-order diffraction light diffracted in the second first-type tracking region E2 is condensed, as a convergent light spot 9e2, on a location spaced by the distance PX2 from the optical axis 34 for outgoing light from the first light emission point 32 of the light source 12 toward the + direction of the radial direction X, as well as spaced by the distance PY toward the + direction of the tangential direction Y. The convergent light spot 9e2 is provided on the second straight line L2. The convergent light spot 9e2 resulting from diffraction in the second first-type tracking region E2 is slightly larger in spot shape than the convergent light spot 9e on the fifth light-receiving region 6e, which results from diffraction in the first first-type tracking region E1.

When zero-order diffraction light of the first wavelength produced by the light-dividing element 46 is incident on the second second-type tracking region F2, the zero-order diffraction light diffracted in the second second-type tracking region F2 is condensed, as a convergent light spot 9f2, on a location spaced by the distance PX2 from the optical axis 34 for outgoing light from the first light emission point 32 of the light source 12 toward the + direction of the radial direction X, as well as spaced by the distance PY toward the + direction of the tangential direction Y. The convergent light spot 9f2 resulting from diffraction in the second second-type tracking region F2 is slightly larger in spot shape than the convergent light spot 9f on the sixth light-receiving region 6f, which results from diffraction in the first second-type tracking region F1.

As shown in FIG. 4, when zero-order diffraction light of the second wavelength is incident on the second focus region B of the diffraction region 19, the zero-order diffraction light diffracted in the second focus region B is condensed, as a convergent light spot 9a, on a location spaced by the distance PX1 from the optical axis 34 for outgoing light from the first light emission point 32 of the light source 12 toward the + direction of the radial direction X. The location of the convergent light spot 9a is the same as the location of the convergent light spot 9a of the first-wavelength light as described previously, namely the location of convergence of the zero-order diffraction light of the first wavelength diffracted in the first focus region A, which is spaced by the distance PX1 from the optical axis 34 for outgoing light from the first light emission point 32 of the light source 12 toward the + direction of the radial direction X. Accordingly, the angle of diffraction of zero-order diffraction light of the first wavelength at a given point on the parallel dividing line 27 in the first focus region A and the angle of diffraction of zero-order diffraction light of the second wavelength at the same given point on the parallel dividing line 27 in the second focus region B are set at the same value.

When zero-order diffraction light of the second wavelength is incident on the first focus region A of the diffraction region 19, the zero-order diffraction light diffracted in the first focus region A is condensed, as a convergent light spot 9d, on a location spaced by a distance of PX3 from the optical axis 34 for outgoing light from the first light emission point 32 of the light source 12 toward the + direction of the radial direction X. The distance PX3 is longer than the distance PX1. A straight line, which extends in the tangential direction Y while passing through the location of the convergent light spot 9d spaced by the distance PX3 from the optical axis 34 for outgoing light from the first light emission point 32 of the light source 12 on the light-receiving surface of the light-receiving element 6, will be termed "third straight line L3". On the light-receiving surface of the light-receiving element 6, the third straight line L3 passes through the fourth light-receiving region 6d.

When zero-order diffraction light of the second wavelength produced by the light-dividing element 46 is incident on the second first-type tracking region E2 of the diffraction region 19, the zero-order diffraction light diffracted in the second first-type tracking region E2 is condensed, as a convergent light spot 9e in a dot or nearly dot form, on a location spaced by the distance PX1 from the optical axis 34 for outgoing light from the first light emission point 32 of the light source 12 toward the + direction of the radial direction X, as well as spaced by the distance PY toward the − direction of the tangential direction Y. When zero-order diffraction light of the second wavelength produced by the light-dividing element 46 is incident on the second second-type tracking region F2, the zero-order diffraction light diffracted in the second second-type tracking region F2 is condensed, as a convergent light spot 9f in a dot or nearly dot form, on a location spaced by the distance PX1 from the optical axis 34 for outgoing light from the first light emission point 32 of the light source 12 toward the + direction of the radial direction X, as well as spaced by the distance PY toward the + direction of the tangential direction Y. Where the relationship between the pitch of diffraction grooves and the diffraction angle is concerned, formulae similar to those that have already been described in connection with the first and second focus regions A and B hold true. Therefore, the description thereof will be omitted to avoid overlap.

When negative first-order diffraction light of the second wavelength produced by the light-dividing element 46 is incident on the second first-type tracking region E2, the negative first-order diffraction light diffracted in the second first-type tracking region E2 is condensed on a location within the seventh light-receiving region 6g spaced by a distance of SY2 from the convergent light spot 9e, which results from zero-order diffraction in the second first-type tracking region E2, toward the − direction of the tangential direction Y. When positive first-order diffraction light of the second wavelength produced by the light-dividing element 46 is incident on the second first-type tracking region E2, the positive first-order diffraction light diffracted in the second first-type tracking region E2 is condensed, in a dot or nearly dot form, on a location within the ninth light-receiving region 6i spaced by the distance SY2 from the convergent light spot 9e, which results from diffraction in the second first-type tracking region E2, toward the + direction of the tangential direction Y. The distance SY2 is longer than the distance SY, because the second wavelength is longer than the first wavelength, and thus the angle of diffraction of ±first-order diffraction light of the second wavelength produced by the light-dividing element 46 is larger than that of ±first-order diffraction light of the first wavelength.

When negative first-order diffraction light of the second wavelength produced by the light-dividing element 46 is incident on the second second-type tracking region F2, the negative first-order diffraction light diffracted in the second second-type tracking region F2 is condensed on a location within the eighth light-receiving region 6h spaced by a distance of SY2 from the convergent light spot 9f, which results from zero-order diffraction in the second second-type tracking region F2, toward the − direction of the tangential direction Y. When positive first-order diffraction light of the second wavelength produced by the light-dividing element 46 is incident on the second second-type tracking region F2, the positive first-order diffraction light diffracted in the second second-type tracking region F2 is condensed, in a dot or nearly dot form, on a location within the tenth light-receiving region 6j spaced by the distance SY2 from the convergent light spot 9f, which results from diffraction in the second second-type tracking region F2, toward the + direction of the tangential direction Y.

When zero-order diffraction light of the second wavelength produced by the light-dividing element 46 is incident on the first first-type tracking region E1, the zero-order diffraction light diffracted in the first first-type tracking region E1 is condensed, as a convergent light spot 9e3, on a location spaced by the distance PX3 from the optical axis 34 for outgoing light from the first light emission point 32 of the light source 12 toward the + direction of the radial direction X, as well as spaced by the distance PY toward the + direction of the tangential direction Y. The convergent light spot 9e3 resulting from diffraction in the first first-type tracking region E1 is slightly larger in spot shape than the convergent light spot 9e on the fifth light-receiving region 6e, which results from diffraction in the second first-type tracking region E2.

When zero-order diffraction light of the second wavelength produced by the light-dividing element 46 is incident on the first second-type tracking region F1, the zero-order diffraction light diffracted in the first second-type tracking region F1 is condensed, as a convergent light spot 9f3, on a location spaced by the distance PX3 from the optical axis 34 for outgoing light from the first light emission point 32 of the light source 12 toward the + direction of the radial direction X, as well as spaced by the distance PY toward the − direction of the tangential direction Y. The convergent light spot 9f3 resulting from diffraction in the first second-type tracking region F1 is slightly larger in spot shape than the convergent light spot 9f on the sixth light-receiving region 6f, which results from diffraction in the second second-type tracking region F2.

As has already been described, by setting the angle of diffraction of the first-wavelength light in the first focus region A and the angle of diffraction of the second-wavelength light in the second focus region B at the same value, it is possible to establish a relational expression representing that the diffraction angle θA1d in the formula (1) equals the diffraction angle θB2d in the formula (4). Although the first light emission point 32 and the second light emission point 33 of the light source 12 take different positions, for the sake of simplicity in explanation, these light emission points are assumed to be identical, and also the angles of incidence of light from these light emission points on the diffractive element 16 are assumed to be zero degrees. In this case, the following formula (5) holds.

$$\lambda 1/dA = \lambda 2/dB \quad (5)$$

At this time, on the basis of the formula (2) and the formula (5), the following formula (6) holds for the diffraction angle θB1d for the case where light of the first wavelength is incident on the second focus region B.

$$\sin \theta B1d = (\lambda 1/\lambda 2) \cdot \sin \theta A1d \quad (6)$$

Hence, a relationship of λ1 λ2 can be employed between the first wavelength and the second wavelength. This causes a diffraction-angle relationship of θB1d θA1d to be obtained. Under this condition, the light is diffracted in a direction toward, rather than the location of the convergent light spot 9a serving as the first reference position, the location of the convergent light spot 9c serving as the second reference position close to the optical axis, and eventually attains a position such as the location of the convergent light spot 9c within the third light-receiving region 6c as shown in FIG. 3.

Likewise, the following formula (7) holds for the diffraction angle θA2d for the case where light of the second wavelength is incident on the first focus region A.

$$\sin \theta A2d = (\lambda 2/\lambda 1) \cdot \sin \theta B2d \quad (7)$$

Since the relationship of λ1 λ2 is established between the first wavelength and the second wavelength, it follows that a diffraction-angle relationship of θA2d θB2d is obtained. Under this condition, the light is diffracted in a direction toward, rather than the location of the convergent light spot 9a serving as the first reference position, the location of the convergent light spot 9d serving as the third reference position situated away from the optical axis 34, and eventually attains a position such as the location of the convergent light spot 9d within the fourth light-receiving region 6d as shown in FIG. 4.

Also in the first first-type tracking region E1 and the second first-type tracking region E2, in a like manner, the angle of diffraction of the first-wavelength light incident on the first first-type tracking region E1 and the angle of diffraction of the second-wavelength light incident on the second first-type tracking region E2 are so determined that each of the resultant convergent light spots attains the position of the convergent light spot 9e. Also in the first second-type tracking region F1 and the second second-type tracking region F2, in a like manner, the angle of diffraction of the first-wavelength light incident on the first second-type tracking region F1 and the angle of diffraction of the second-wavelength light incident on the second second-type tracking region F2 are so determined that each of the resultant convergent light spots attains the position of the convergent light spot 9f.

The diffraction grooves provided in the first and second focus regions A and B of the diffraction region 19 extend in the tangential direction Y in a linear fashion or a curved fashion. On the basis of the relationship of λ1 λ2 and the formula (5), a relationship of dA dB can be employed between the pitch of the diffraction grooves of the first focus region A and the pitch of the diffraction grooves of the second focus regions B. Therefore, the regions of larger pitch and the regions of smaller pitch are arranged alternately in a direction perpendicular to the parallel dividing line 27.

Moreover, the diffraction grooves provided in the first and second first-type tracking regions E1 and E2 extend in a direction perpendicular to a straight line connecting the center point P0 of the diffraction region 19 with the convergent light spot 9e, in a linear fashion or a curved fashion. As for the pitch of the diffraction grooves provided in the first first-type tracking region E1 and the pitch of the diffraction grooves provided in the second first-type tracking regions E2, as with the above case, the latter is greater than the former, and the regions of different pitches are arranged alternately, with the parallel dividing line 27 lying therebetween as a boundary.

Similarly, the diffraction grooves provided in the first and second second-type tracking regions F1 and F2 extend in a direction perpendicular to a straight line connecting the center point P0 of the diffraction region 19 with the convergent light spot 9f, in a linear fashion or a curved fashion. As for the pitch of the diffraction grooves provided in the first second-type tracking region F1 and the pitch of the diffraction grooves provided in the second second-type tracking regions F2, as with the above case, the latter is greater than the former, and the regions of different pitches are arranged alternately, with the parallel dividing line 27 lying therebetween as a boundary.

The diffraction region 19 can be produced by the photolithography method insofar as the diffractive element 16 is formed of a transparent glass substrate, or can be produced by the 2P method or die molding technique insofar as the diffractive element 16 is formed of a transparent resin substrate.

Next, the principle of operation of the optical pickup apparatus 10 will be explained. A non-illustrated servo signal producing section produces a focus error signal and a tracking error signal from an electric signal obtained from each light-receiving region. In response to the servo signal, namely focus error signal and tracking error signal, a non-illustrated servo signal processing section exercises focus servo control and tracking servo control, and effects positional control of the objective lens 29 equipped with a non-illustrated actuator in focusing and tracking directions in a manner so as to follow a converging point of light condensed by the objective lens 29 on a predetermined track of the optical recording medium 11. A non-illustrated drive control unit for controlling the servo signal producing section, the servo signal processing section, and the actuator is implemented based on the related art.

More specifically, a focus error signal (hereafter also referred to as "FES") is a difference between electric signals Sa and Sb detected in the first and second light-receiving regions 6a and 6b, respectively, that received signals of light diffracted in the first focus region A or the second focus region B of the diffraction region 19. That is, FES can be calculated in accordance with the following formula (8).

$$FES = Sa - Sb \quad (8)$$

In the optical pickup apparatus 10, focus servo control is exercised by the knife edge method utilizing a knife edge with, as a boundary, the knife edge portion 26 on the diffraction region 19. Particularly, since light is condensed just as a single convergent light spot in a dot or nearly dot form with the knife edge, even if the light-receiving element 6 is positionally displaced in an XY direction within an XY plane perpendicular to the optical-axis direction Z or rotated, correction can be made by displacing the diffractive element 16 in the XY direction within the XY plane perpendicular to the optical-axis direction Z or causing its rotation for adjustment. This makes it possible to detect a focus error signal FES at all times by the knife edge method, and thereby perform focus servo control with stability.

Hereinafter, electric signals detected in the first to sixth light-receiving regions 6a to 6f will be represented as Sa, Sb, Sc, Sd, Se, and Sf, respectively. The fact that the first focus region A and the second focus region B included in the focus region 22 are individually corresponding to their respective ones of different types of light means that one type of light is caused to arrive at a predetermined point on a light-receiving region, which is herein the convergent light spot 9a fixed in the vicinity of the boundary between the first light-receiving region 6a and the second light-receiving region 6b.

On the other hand, a tracking error signal (hereafter also referred to as "TES") is, according to the differential push pull method (hereafter referred to as "DPP method"), a difference between electric signals Se and Sf detected in the fifth and sixth light-receiving regions 6e and 6f, respectively. That is, TES can be calculated in accordance with the following formula (9).

$$\text{TES} = Se - Sf \quad (9)$$

Moreover, according to the differential phase detection method (hereafter referred to as "DPD method") which differs from the DPP method, TES can be calculated in accordance with the following formula (10).

$$\text{TES} = \text{Phase}(Se - Sf) \quad (10)$$

The DPD method allows stable servo control and thus makes it possible to condense light on a desired track of the optical recording medium 11. In the case of adopting the DPD method, at least in the fifth and sixth light-receiving regions 6e and 6f, the phase of incident light is detected. In the formula (10), the term "Phase(Se−Sf)" represents the phase difference between light obtained from the fifth light-receiving region 6e and light obtained from the sixth light-receiving region 6f.

Further, according to the three-beam method which differs from the DPP method and the DPD method, on the basis of electric signals Sg to Sl detected in the seventh to twelfth light-receiving regions 6g to 6l, TES can be calculated in accordance with the following formula (11).

$$\text{TES} = (Sg + Sh + Sk) - (Si + Sj + Sl) \quad (11)$$

That is, TES is given as a difference value obtained by subtracting, from the sum of electric signals derived from positive first-order diffraction light diffracted in the light-dividing element 46, the sum of electric signals derived from negative first-order diffraction light. Since calculation of tracking error signals and focus error signals is performed in accordance with the formulae (8) to (10), it is possible for the optical pickup apparatus 10 to effect stable servo control and thus condense light on a desired track of the optical recording medium 11.

When a playback signal is represented as RF, RF can be calculated in accordance with the following formula (12).

$$RF = Sa + Sb + Sc + Sd + Se + Sf \quad (12)$$

Accordingly, the optical pickup apparatus 10 is capable of stable reproduction of track playback signals RF.

In the first embodiment, the width Wa as well as the width Wb of the parallel dividing line 27 is set to be greater than or equal to five times the pitch dB of diffraction grooves of larger pitch provided in the second focus region B, and the ratio of the width Wa to the width Wb is 1 to 1. However, the ratio of the width Wa to the width Wb is not limited to 1 to 1. For example, the ratio can be varied for adjustment of signal intensity of servo signals outputted in the case of using light of the first wavelength and the case of using light of the second wavelength, respectively.

More specifically, for example, when sensitivity to light of the first wavelength is lower than sensitivity to light of the second wavelength, the width Wa is set to be larger than the width Wb so that the first focus region A becomes larger in area than the second focus region B. This makes it possible to increase the signal amplitude of a RF signal or focus error signal FES derived from light of the first wavelength, and thereby achieve improvement in signal-to-noise ratio (S/N for short), with the consequent enhancement of signal quality. That is, the ratio in area between the first focus region A and the second focus region B may be determined in consideration of the sensitivity of each light-receiving region to different types of light having different wavelengths.

Moreover, in the first embodiment, the convergent light spots 9e and 9f of light incident on the light-receiving element 6 are located on the first straight line L1, and the fifth and sixth light-receiving regions 6e and 6f are equal in radial direction X-wise dimension to the first and second light-receiving regions 6a and 6b. However, this does not suggest any limitation. For example, the dimensions of the fifth and sixth light-receiving regions 6e and 6f in the radial direction X as well as the tangential direction Y may be so determined that light of the first and second wavelengths can be received according to the locations of the convergent light spots 9e and 9f.

It is preferable that the angle α which the knife edge portion 26 forms with the parallel dividing line 27 falls in a range of 30 degrees or more and 150 degrees or less. If the angle α of the parallel dividing line 27 is unduly small, due to foreign particles or dirt attached onto the optical recording medium 11, part of zero-order diffraction light on the diffractive element 16 decreases in light intensity, and the resultant dark area with lower light intensity moves in the Y direction. Therefore, when the angle α is small, this leads to an undesirable increase in noise signals that find their ways into focus error signals and tracking error signals. With this in view, by setting the angle α so that some inclination can be provided with respect to the knife edge portion 26, it is possible to achieve noise reduction and thereby perform focus servo control and tracking servo control with stability.

Moreover, in the first embodiment, in the case of adopting the three-beam method for tracking servo, as has already been described, the difference in signal output between ±first-order diffraction light produced by the light-dividing element 46 is defined as a tracking error signal.

Figure 5A:
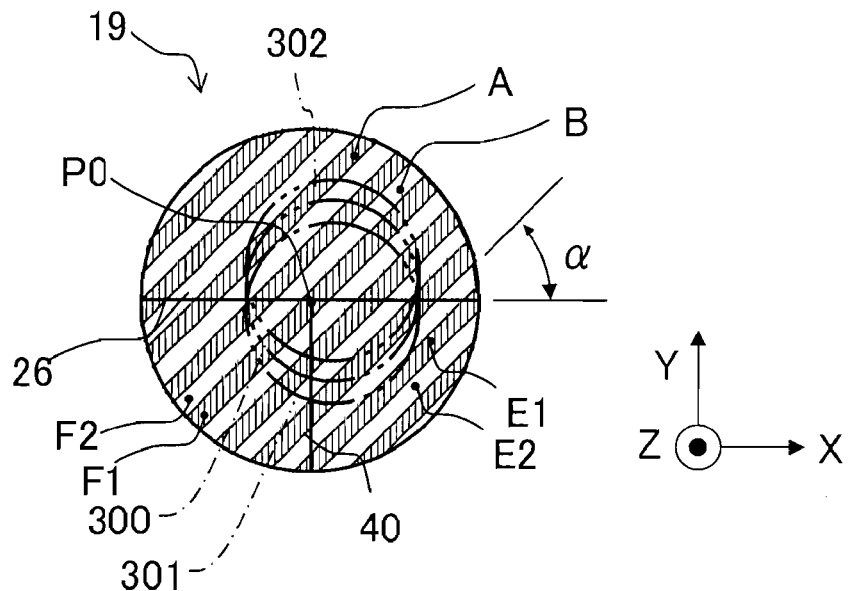
FIGS. 5A to 5C are views of a state where dividing lines are projected onto ±first-order diffraction light incident on the diffractive element.
Figure 5B:
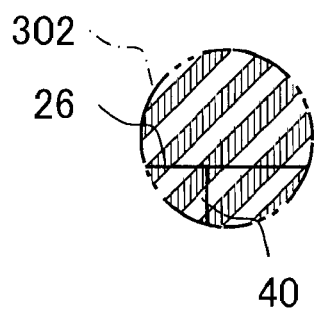
Figure 5C:
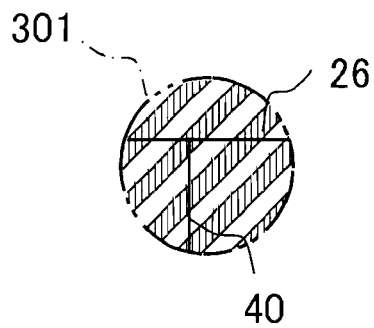

FIGS. 5A to 5C are views of a state where dividing lines are projected onto ±first-order diffraction light incident on the diffractive element 16. FIG. 5A is a plan view of the diffraction region 19 and light of the second wavelength incident on the diffraction region 19, as viewed in the optical-axis direction Z when the optical pickup apparatus 10 is operated with light of the second wavelength. FIG. 5B is a plan view illustrating, of the aforementioned second-wavelength light incident on the diffraction region 19, positive first-order diffraction light 302 incident on the diffraction region 19, and also the dividing lines of the diffraction region 19. FIG. 5C is a plan view illustrating, of the second-wavelength light incident on the diffraction region 19, negative first-order diffraction light 301 incident on the diffraction region 19, and also the dividing lines of the diffraction region 19.

In the positive first-order diffraction light 302, the knife edge portion 26 is displaced in the −Y direction from the center of the positive first-order diffraction light 302, and the tracking determination dividing line 40 is displaced in the − direction of the radial direction X from the center of the positive first-order diffraction light 302. In the negative first-order diffraction light 301, the knife edge portion 26 is displaced in the + direction of the tangential direction Y from the center of the negative first-order diffraction light 301, and the tracking determination dividing line 40 is displaced in the − direction of the radial direction X from the center of the negative first-order diffraction light 301. Moreover, spot images on the diffraction region 19 are divided by a plurality of parallel dividing lines 27 extending at the angle α with respect to the knife edge portion 26.

As shown in FIGS. 5B and 5C, out of light of the second wavelength, a portion to be used in the three-beam method is light which passes through a segmented region for the second wavelength. This segmented region lies within the range of effective diameter of the ±first-order diffraction light 301, 302 and is, in contrast to a segmented region for the first wavelength illustrated as a diagonally shaded area, illustrated as a non-shaded hollow area. There are a plurality of such segmented regions for the second wavelength in the form of hollow areas within the range of effective diameter, and these segmented regions are arranged in succession. Accordingly, even if zero-order diffraction light 300 and the ±first-order diffraction light 301 and 302 incident on the diffraction region 19 undergo some displacement in the Y direction, since the segmented regions for the second wavelength in the form of hollow areas stay constantly within the range of effective diameter, it is possible to maintain a light-intensity balance between the positive first-order diffraction light 302 and the negative first-order diffraction light 301 with little variation. As a result, the tracking error signal TES obtained by calculation using the formula (11) is less likely to incur an offset; wherefore tracking servo control can be performed with stability. As used herein, the effective diameter refers to the region of a spot image of each of the zero-order diffraction light 300 and the ±first-order diffraction light 301 and 302 on the diffraction region 19.

According to the first embodiment, in the optical pickup apparatus 10, the focus diffraction region 21 and the tracking diffraction region 36 include the focus regions 22 and the tracking regions 38, respectively, that correspond in number with different types of light that is emitted by the light source 12. The focus regions 22, as well as the tracking regions 38, are differently configured to be adaptable to each of different light. The different focus regions 22 diffract their respective ones of different types of light in a direction toward the focus light-receiving region 17. The different tracking regions 38 diffract their respective ones of light of different types in a direction toward the tracking light-receiving region. Moreover, the different focus regions 22 are each composed of a plurality of focus segmented regions of the same type, and the different tracking regions 38 are each composed of a plurality of tracking segmented regions of the same type. The focus segmented regions constituting each of the different focus regions 22 are periodically distributed over the focus diffraction region 21, and the tracking segmented regions constituting each of the different tracking regions 38 are periodically distributed over the tracking diffraction region 36.

The tracking light-receiving region varies depending on a type of method for tracking error detection. Under the DPP method or DPD method, the tracking light-receiving region corresponds to the fifth and sixth light-receiving regions 6e and 6f. Under the three-beam method, it corresponds to the seventh to twelfth light-receiving regions 6g to 6l.

This allows the shared use of the focus light-receiving region 17 and the tracking light-receiving region for two or more types of light having different wavelengths. Moreover, the focus segmented regions constituting each of the different focus regions 22 are periodically distributed over the focus diffraction region 21, and the tracking segmented regions constituting each of the different tracking regions 38 are periodically distributed over the tracking diffraction region 36. The parallel dividing lines 27 defining those focus segmented regions and tracking segmented regions, while straddling the knife edge portion 26 and the tracking determination dividing line 40, extend continuously. Therefore, even if reflected light from the optical recording medium 11 is incident on one of the focus regions 22 of different types, as well as one of the tracking regions 38 of different types, while being positionally displaced in the Y direction, or even if foreign particles or dirt are attached onto the optical recording medium 11, focus servo control and tracking servo control can be performed with stability.

Moreover, according to the first embodiment, a predetermined part of the outer periphery of the focus diffraction region 21 is defined by the rectilinear knife edge portion 26. Irrespective of its light type, the reflected light 18 from the optical recording medium 11 intersects with the region for the incidence of the reflected light on the diffractive element 16; that is, intersects with the diffraction region 19. The focus diffraction region 21 is divided into a plurality of focus segmented regions by a plurality of parallel dividing lines 27 arranged in parallel with each other. The parallel dividing lines 27 are inclined with respect to the knife edge portion 26.

Moreover, according to the first embodiment, the angle which the parallel dividing line 27 forms with the knife edge portion 26 falls in the range of 30 degrees or more and 150 degrees or less. In this case, even if a change of the location of light incident on the diffractive element 16 takes place, the area of the focus segmented regions for one type of light and the area of the focus segmented regions for the other type of light can be distributed effectively among the two or more types of focus regions 22. This makes it possible to perform focus servo with stability. At the same time, even if a change of the location of light incident on the diffractive element 16 takes place, the area of the tracking segmented regions for one type of light and the area of the tracking segmented regions for the other type of light can be distributed effectively among the two or more types of tracking regions 38. This makes it possible to perform tracking servo with stability.

Moreover, according to the first embodiment, the focus segmented regions and the tracking segmented regions each have a plurality of parallelly and periodically-arranged diffraction grooves. In each of the focus segmented regions and the tracking segmented regions, five or more diffraction grooves provided therein intersect with the imaginary plane intersecting perpendicularly with the diffraction grooves of each of the focus segmented regions and the tracking segmented regions. In this way, the number of the diffraction grooves of each of the focus segmented regions and the tracking segmented regions arranged in a direction perpendicular to the diffraction grooves can be set at a necessary minimum value or more required for efficient diffraction. This makes it possible to achieve diffraction in each of the focus segmented regions with high efficiency.

Moreover, in the first embodiment, the third and fourth light-receiving regions 6c and 6d are provided to receive light of the first wavelength or second wavelength that is diffracted by the focus region 22 of other type. However, this does not suggest any limitation. The third and fourth light-receiving regions 6c and 6d may be omitted insofar as a sufficient amount of light can be received just by the first and second light-receiving regions 6a and 6b.

Moreover, in the first embodiment, the first and second light-receiving regions 6a and 6b are arranged, with a boundary between them defined by a straight line parallel to the radial direction X. However, this does not suggest any limitation, and the light-receiving regions may be arranged with inclination. As a matter of fact, with wavelength tolerance given into consideration, variations in the spot shape of received light take place with respect to the location of the convergent light spot 9a serving as the first reference position, which could result in defocusing. Inclination may be required in the interest of correction of the defocusing. By the same token, the radial direction X-wise dimensions and tangential direction Y-wise dimensions of the contours of other light-receiving regions in the first embodiment are cited merely by way of example and without limitation.

Moreover, in the first embodiment, the pitch of the diffraction grooves of the diffraction region 19 is so determined that the first-wavelength light and the second-wavelength light received at the boundary between the first and second light-receiving regions 6a and 6b can be condensed on substantially the same location conforming to the convergent light spot 9a. However, this does not suggest any limitation. The light-condensing position for the first-wavelength light and the light-condensing position for the second-wavelength light may be slightly displaced with respect to each other insofar as the resultant convergent light spots do not go out of the range of first and second light-receiving regions 6a and 6b.

Moreover, in the first embodiment, the first light emission point 32 for the first-wavelength light is located farther away from the light-receiving element 6 than the second light emission point 33 for the second-wavelength light. However, this does not suggest any limitation, and the first light emission point 32 and the second light emission point 33 may be arranged in the place of each other.

Moreover, in the first embodiment, the method for detection of tracking error signals TES can be changed according to a type of the optical recording medium 11. For example, when the first wavelength is assigned to DVD-ROM (Read Only memory) and the second wavelength is assigned to CD-ROM, the DPD method is adopted for the playback of DVD-ROM, and the three-beam method is adopted for the playback of CD-ROM.

Figure 6:
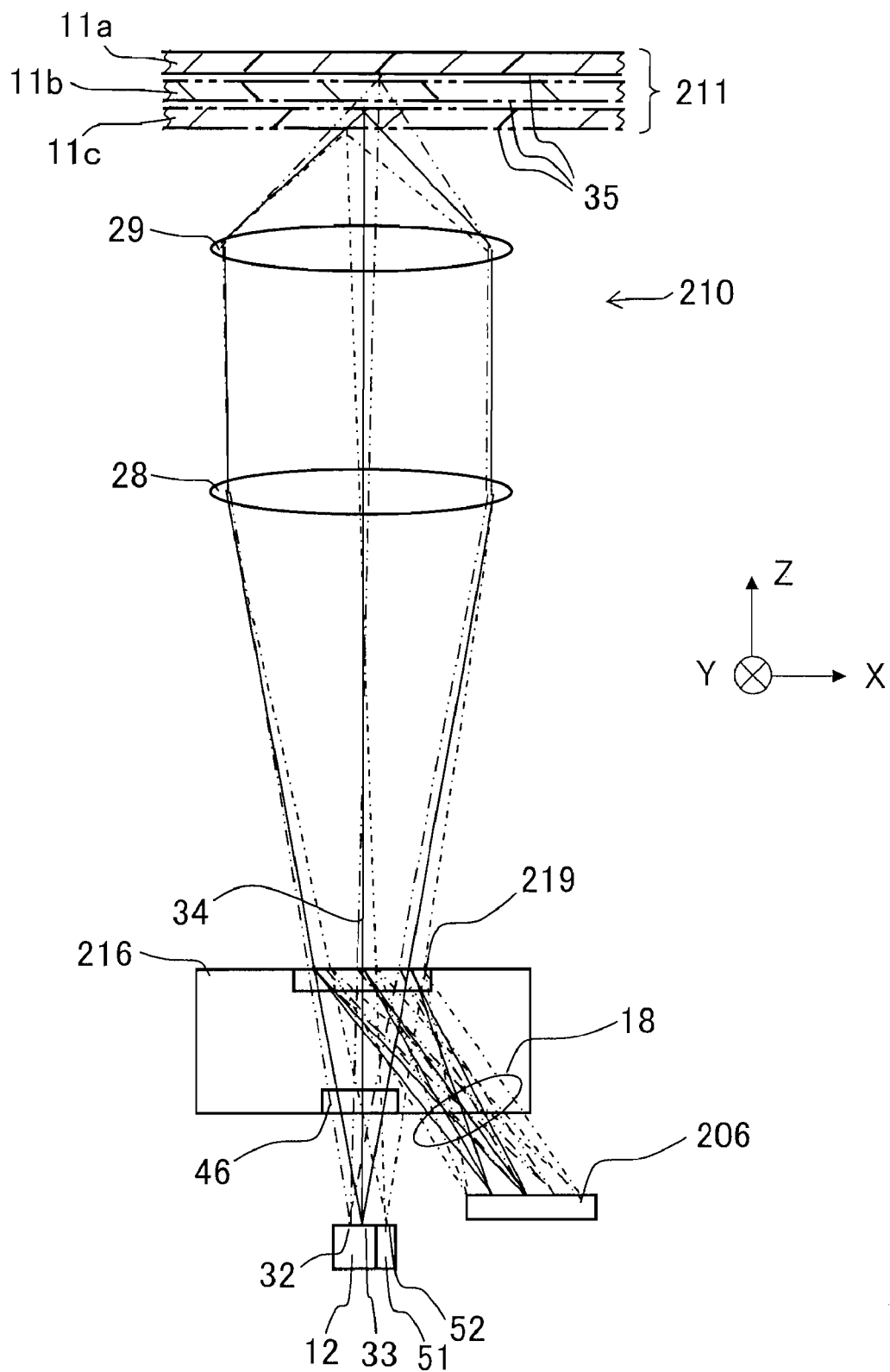
FIG. 6 is a view showing the structure of an optical pickup apparatus in accordance with a second embodiment.
Figure 7:
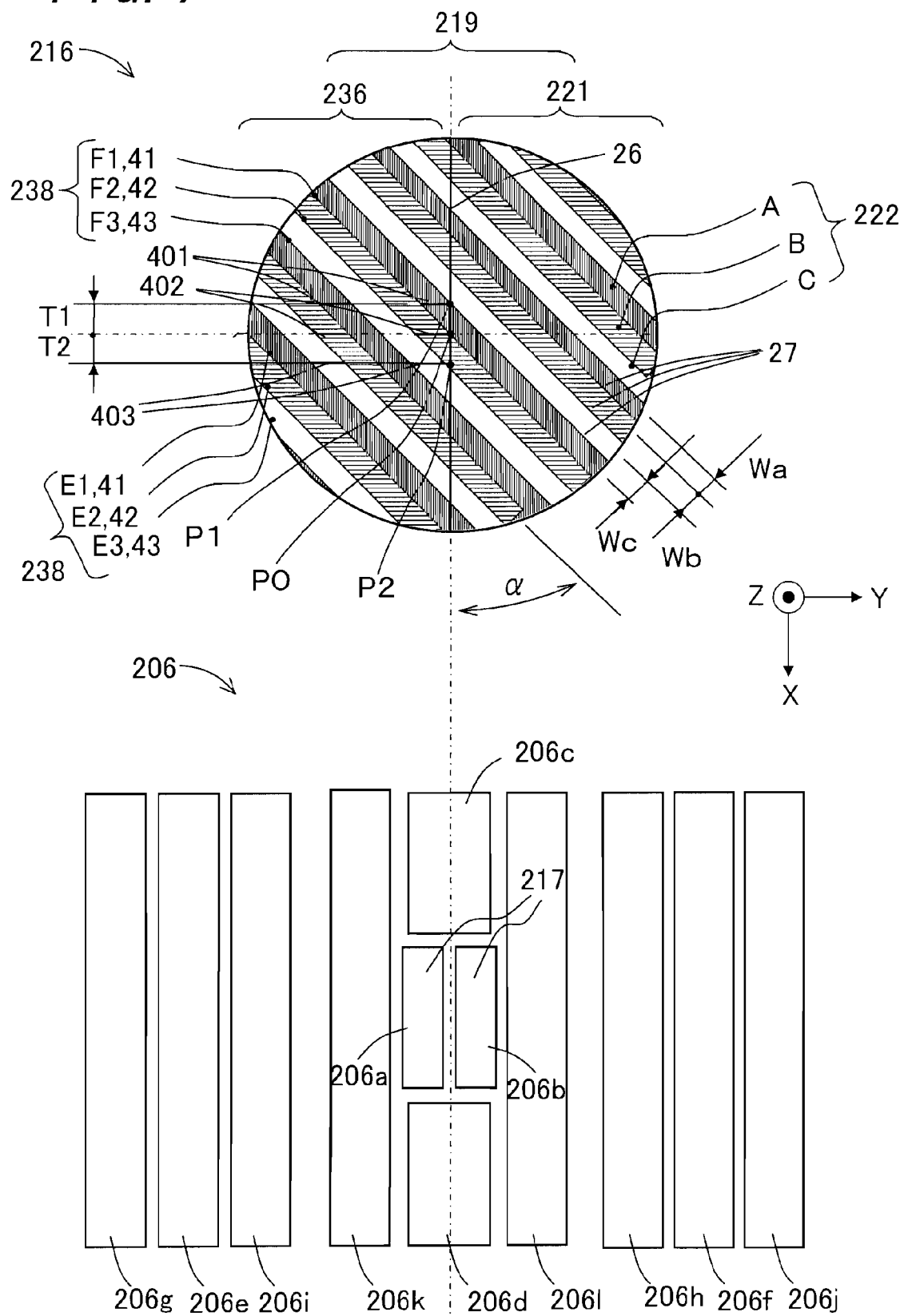
FIG. 7 is a plan view of a diffractive element and individual light-receiving regions.
Figure 8:
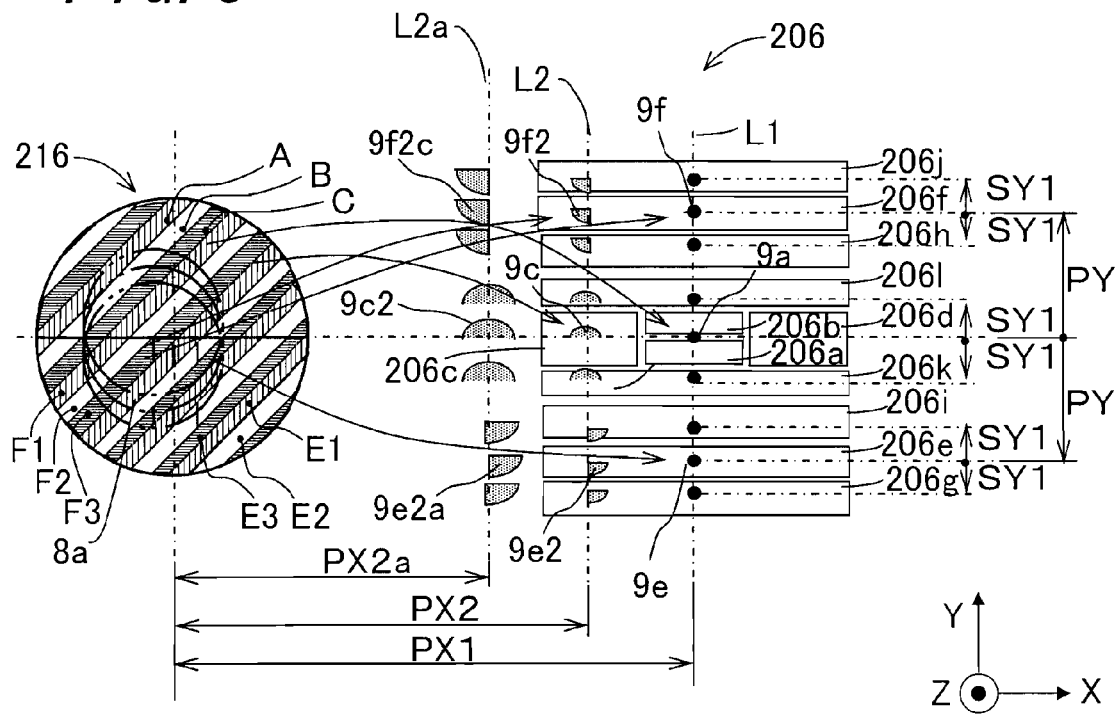
FIG. 8 is a view showing the relationship between the diffractive element and each light-receiving region for the case with light of the first wavelength.
Figure 9:
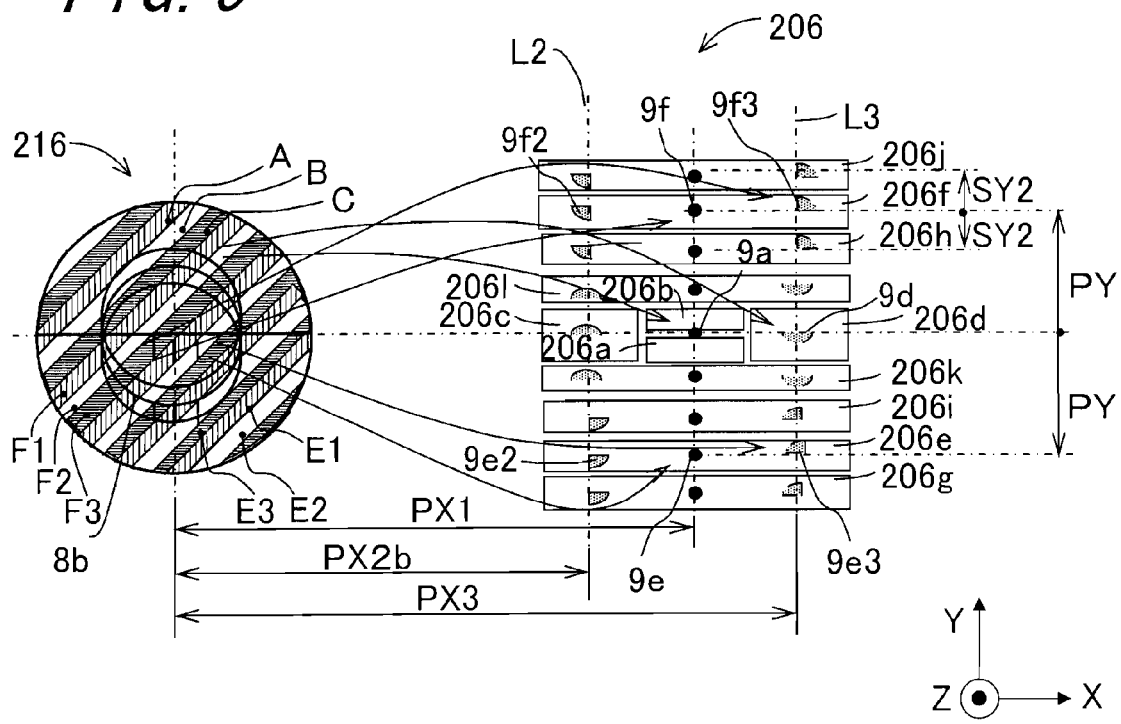
FIG. 9 is a view showing the relationship between the diffractive element and each light-receiving region for the case with light of the second wavelength.
Figure 10:
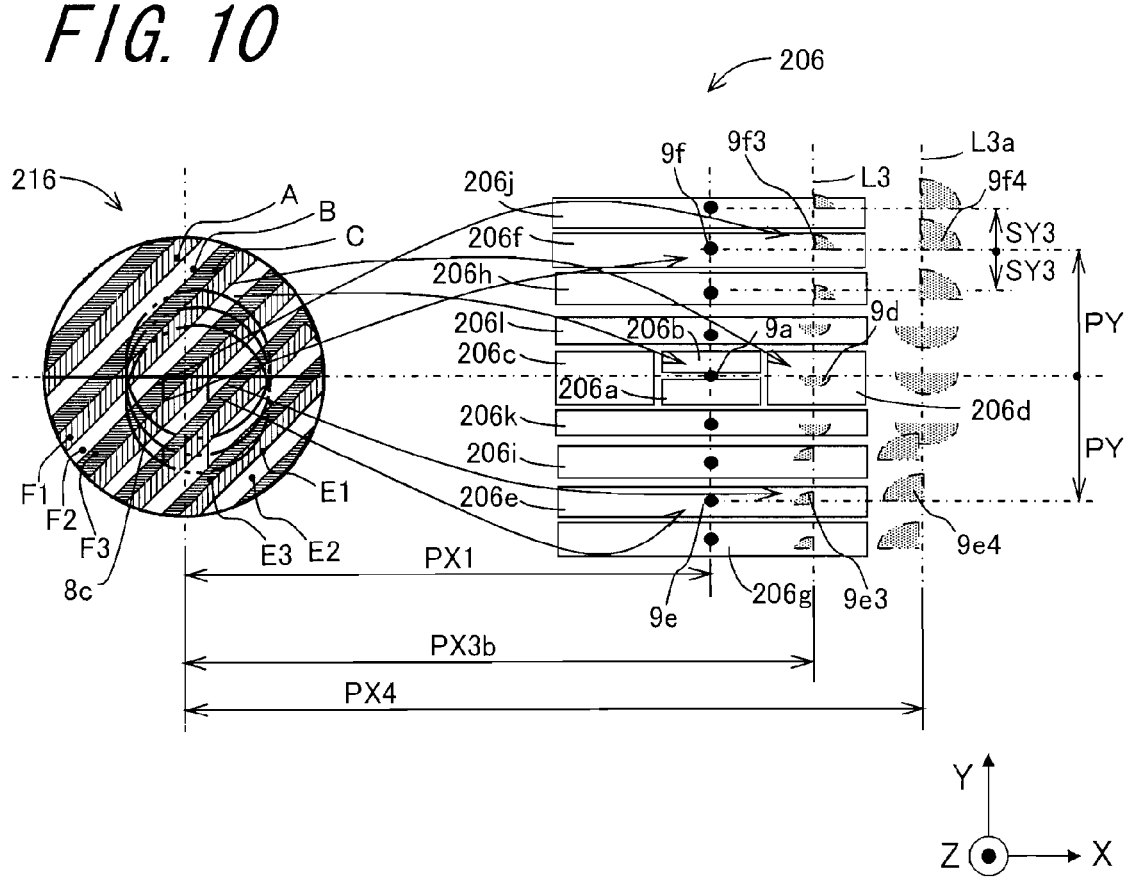
FIG. 10 is a view showing the relationship between the diffractive element and each light-receiving region for the case with light of a third wavelength.
Figure 11:
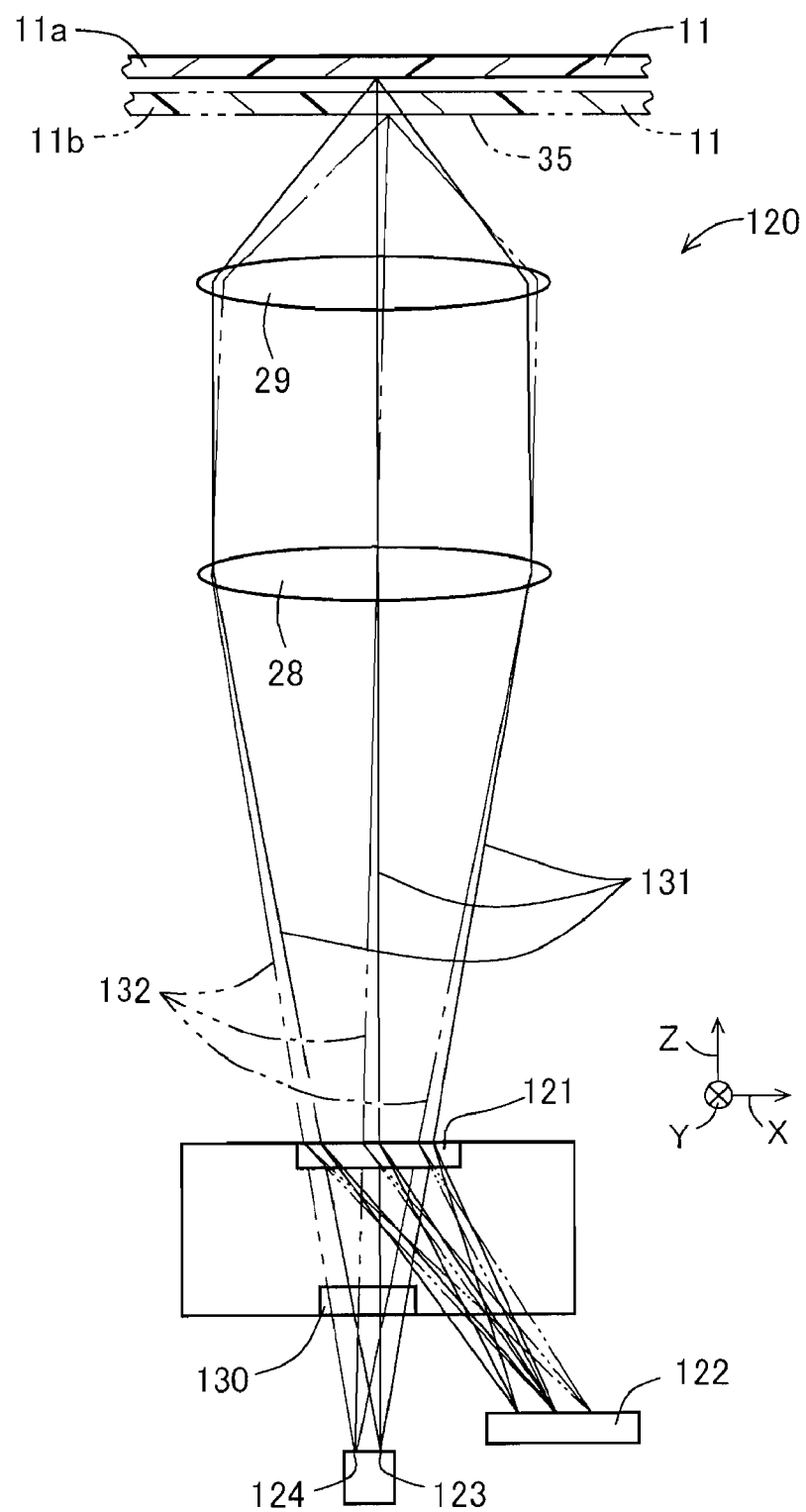
FIG. 11 is a view showing one example of the structure of an optical pickup apparatus of the related art.
Figure 12:
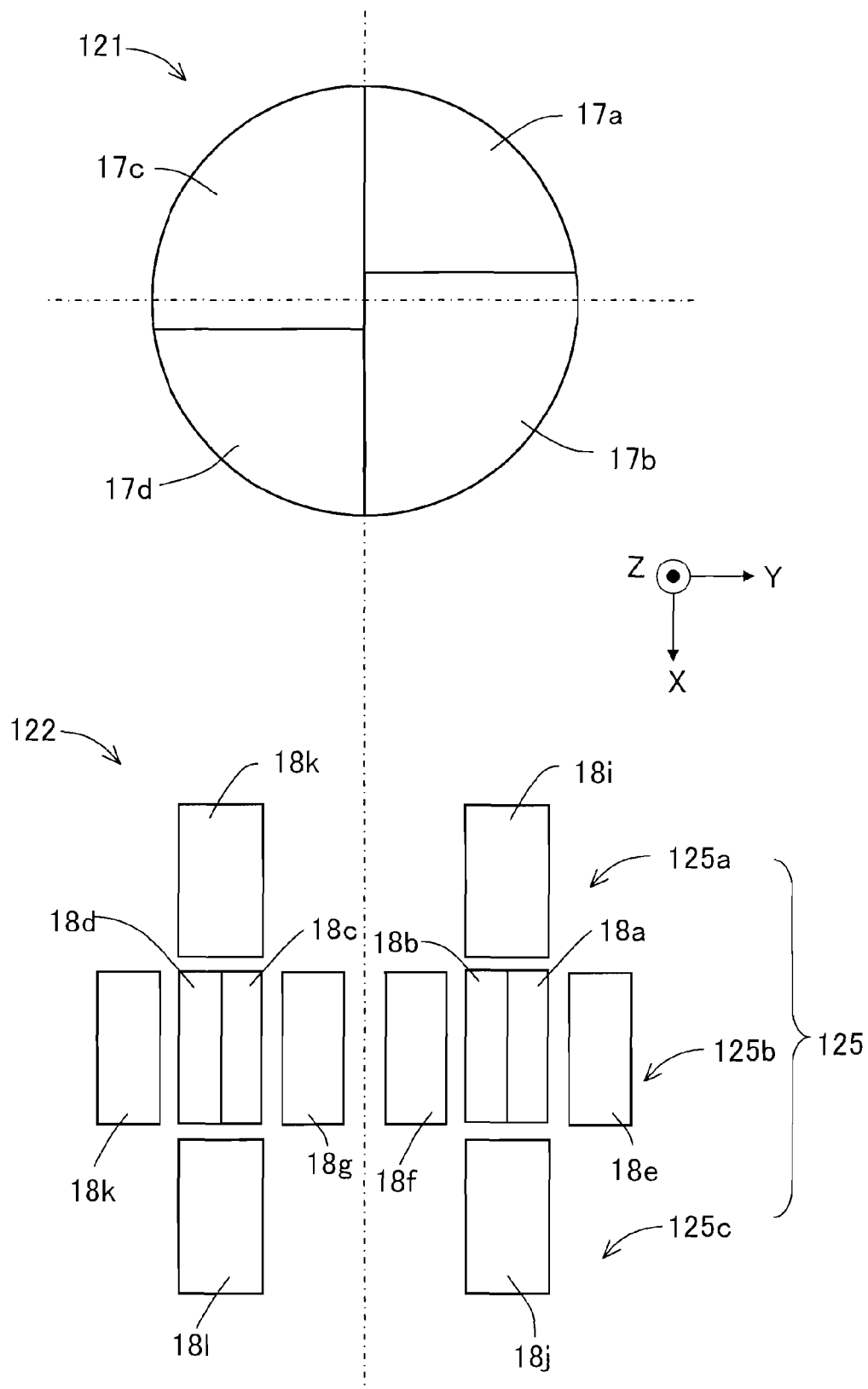
FIG. 12 is a plan view showing a diffractive element and a light-receiving element of the optical pickup apparatus.
Figure 13A:
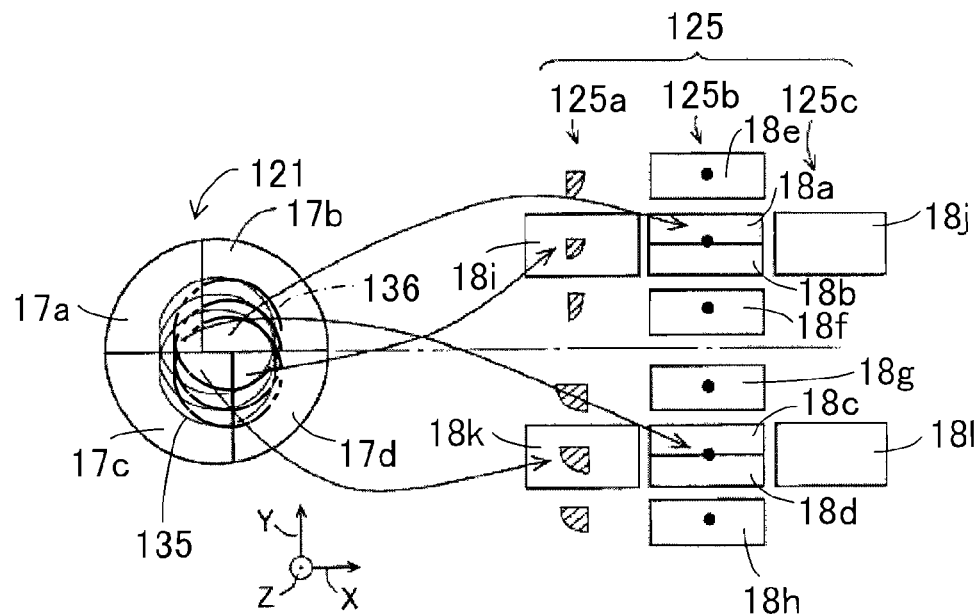
FIGS. 13A and 13B are plan views showing the diffractive element and the light-receiving element subjected to light.
Figure 13B:
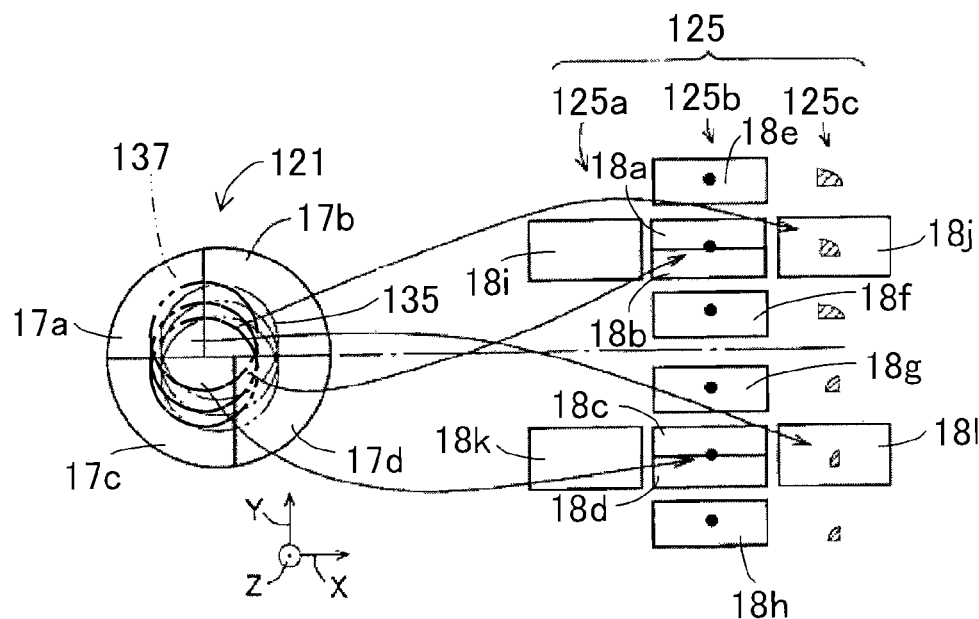
Figure 14A:
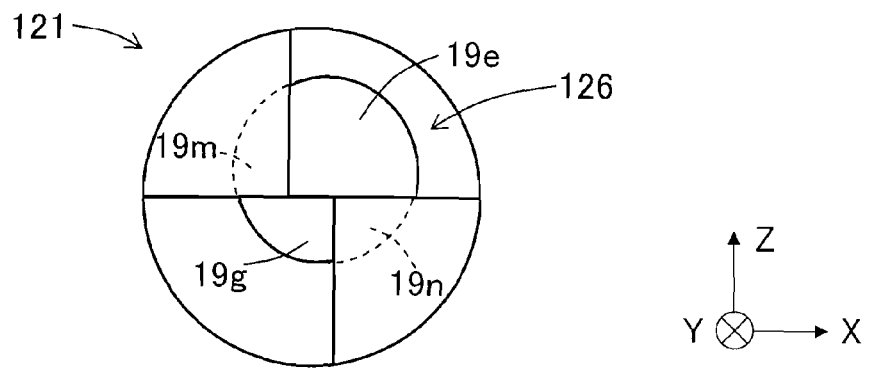
FIGS. 14A to 14C are views showing light spots of a main beam and two sub beams on the diffractive element.
Figure 14B:
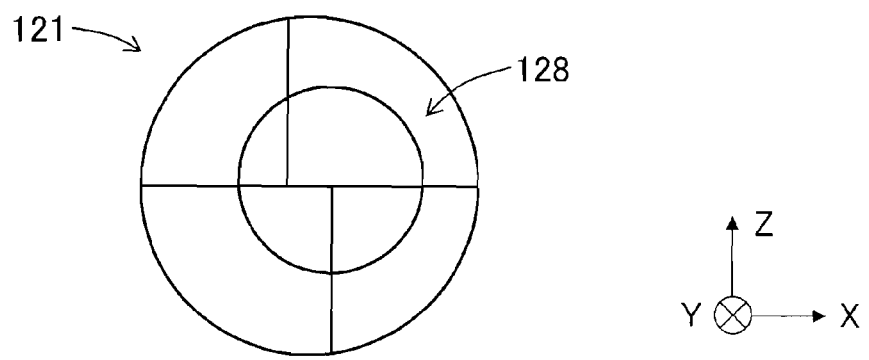
Figure 14C:
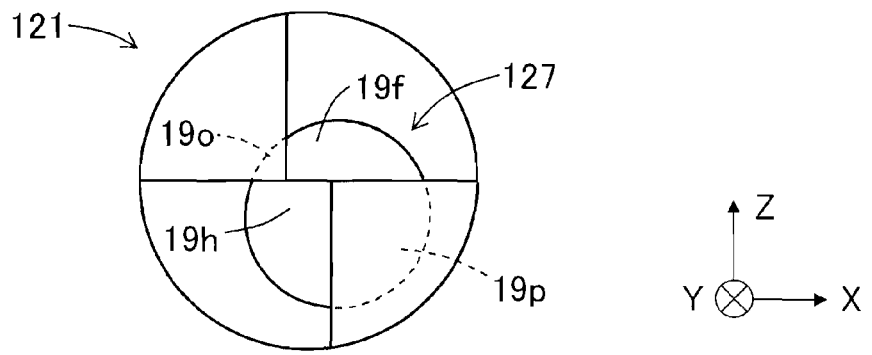

FIG. 6 is a view showing the structure of an optical pickup apparatus 210 in accordance with a second embodiment. FIG. 7 is a plan view of a diffractive element 216 and individual light-receiving regions. FIG. 8 is a view showing the relationship between the diffractive element 216 and each light-receiving region for the case with light of the first wavelength. FIG. 9 is a view showing the relationship between the diffractive element 216 and each light-receiving region for the case with light of the second wavelength. FIG. 10 is a view showing the relationship between the diffractive element 216 and each light-receiving region for the case with light of a third wavelength.

The optical pickup apparatus 210 pertaining to the second embodiment is similar to the optical pickup apparatus 10 pertaining to the first embodiment, and the following description deals mainly with the points of difference of the second embodiment from the first embodiment.

The optical pickup apparatus 210 pertaining to the second embodiment is provided with, in addition to the light source 12 as provided in the optical pickup apparatus 10 pertaining to the first embodiment, a light source 51 for emitting light of the third wavelength. The light source 51 is disposed adjacent to the light source 12 so as to lie closer to the light-receiving element 6 than the light source 12. The light source 51 has a light emission point serving as a third light emission point 52. From the third light emission point 52, light exits in substantially the same direction as the direction of exit of light of the first wavelength and light of the second wavelength emitted from the first light emission point 32 and the second light emission point 33, respectively. In order of increasing wavelength, three different wavelengths are classified as the first wavelength, the second wavelength, and the third wavelength.

The light source 12 is of the monolithic type in which light emission points for emitting light of different wavelengths are provided in a single chip, whereas the light source 51 is of the hybrid type which employs single-wavelength laser chips. However, this does not suggest any limitation, and all of the light sources for the three wavelengths may be constructed of a monolithic element in which three light emission points are provided in a single chip, or a hybrid element in which single-wavelength laser chips that are independent of each other in wavelength are arranged close to each other. Moreover, although the light sources are so designed that the first-wavelength light, the second-wavelength light, and the third-wavelength light lie side by side in the order named in the X direction, the positional relationship is not so limited. Insofar as light of an intermediate wavelength exists in the middle, they may lie side by side in reverse order in the X direction. Further, although the first light emission point 32 for the first-wavelength light, the second light emission point 33 for the second-wavelength light, and the third light emission point 52 for the third-wavelength light are illustrated as being aligned in the X direction, the positional relationship is not so limited. One, or two or more of the light emission points may be displaced in the Y direction.

Like the light-receiving element 6 disposed inside the optical pickup apparatus 10 pertaining to the first embodiment, the light-receiving element 206 has 12 light-receiving regions, namely the first to twelfth light-receiving regions 206a to 206l. A dissimilarity is that the X direction-wise dimension of each of the fifth to twelfth light-receiving regions 206e to 206l is equal to a distance between an end point of the third light-receiving region 206c toward the − direction of the radial direction X and an end point of the fourth light-receiving region 206d toward the + direction of the radial direction X.

A diffraction region 219 provided in the diffractive element 216 comprises focus segmented regions included in a third focus region C and tracking segmented regions included in a third first-type tracking region E3 and a third second-type tracking region F3, in addition to the focus segmented regions included in the first and second focus regions A and B and the tracking segmented regions included in the first first-type tracking region E1, the second first-type tracking region E2, the first second-type tracking region F1, and the second second-type tracking region F2 obtained by dividing the diffraction region by the parallel dividing lines 27 inclined at the angle α with respect to the knife edge portion 26 provided in the diffraction region 19 pertaining to the first embodiment.

A focus diffraction region 221 and a tracking diffraction region 236, which are obtained by dividing the diffraction region 219 by the focus determination dividing line 26, are each given a semicircular shape. The tracking diffraction region 236 is divided into a first tracking region E and a second tracking region F, and the tracking regions are subdivided into six tracking regions of different types by the parallel dividing lines 27, namely a first first-type tracking region E1, a second first-type tracking region E2, a third first-type tracking region E3, a first second-type tracking region F1, a second second-type tracking region F2, and a third second-type tracking region F3.

The tracking determination dividing line 40 for dividing the tracking diffraction region into the first tracking region E and the second tracking region F is classified as a first tracking determination dividing line 401, a second tracking determination dividing line 402, and a third tracking determination dividing line 403. The first tracking determination dividing line 401 allows division of the first first-type tracking region E1 as well as the first second-type tracking region F1. The second tracking determination dividing line 402 allows division of the second first-type tracking region E2 as well as the second second-type tracking region F2. The third tracking determination dividing line 403 allows division of the third first-type tracking region E3 and the third second-type tracking region F3.

The second tracking determination dividing line 402 is disposed on a straight line extending in a direction corresponding to the direction of the tangent to the track while passing through a center point P0 in the tracking diffraction region 236. The first tracking determination dividing line 401 is disposed on a straight line extending from a point P1, which is spaced by a distance T1 from the center point P0 toward the − direction of the radial direction X, along a direction corresponding to the direction of the tangent to the track in the tracking diffraction region 236. The third tracking determination dividing line 403 is disposed on a straight line extending from a point P2, which is spaced by a distance T2 from the center point P0 toward the + direction of the radial direction X, along a direction corresponding to the direction of the tangent to the track in the tracking diffraction region 236.

In the focus diffraction region 221 provided in the diffraction region 219, the first focus region A, the second focus region B, and the third focus region C are arranged adjacent to one another in the order named. Likewise, in the tracking diffraction region 236, the first first-type tracking region E1, the second first-type tracking region E2, and the third first-type tracking region E3 are arranged adjacent to one another in the order named, and the first second-type tracking region F1, the second second-type tracking region F2, and the third second-type tracking region F3 are arranged adjacent to one another in the order named.

As shown in FIG. 8, when zero-order diffraction light of the first wavelength produced by the light-dividing element 46 is incident on the first focus region A of the diffraction region 219, the zero-order diffraction light diffracted in the first focus region A is condensed, as a convergent light spot 9a, on a location spaced by a distance of PX1 from the optical axis 34 for outgoing light from the first light emission point 32 of the light source 12 toward the + direction of the radial direction X. The convergent light spot 9a on the light-receiving surface of the light-receiving element 206 is condensed in a dot or nearly dot form on the boundary between the first light-receiving region 206a and the second light-receiving region 206b. A straight line, which extends in the tangential direction Y while passing through the location of the convergent light spot 9a spaced by the distance PX1 from the optical axis 34 for outgoing light from the first light emission point 32 of the light source 12 on the light-receiving surface of the light-receiving element 206, will be termed "first straight line L1". On the light-receiving surface of the light-receiving element 206, the first straight line L1 passes through the first, second, and fifth to twelfth light-receiving regions 206a, 206b, and 206e to 206l.

When negative first-order diffraction light of the first wavelength produced by the light-dividing element 46 is incident on the first focus region A of the diffraction region 219, the negative first-order diffraction light diffracted in the first focus region A is condensed on a location within the eleventh light-receiving region 206k spaced by a distance of SY1 from the convergent light spot 9a, which results from zero-order diffraction in the first focus region A, toward the − direction of the tangential direction Y. When positive first-order diffraction light of the first wavelength produced by the light-dividing element 46 is incident on the first focus region A, the positive first-order diffraction light diffracted in the first focus region A is condensed on a location within the twelfth light-receiving region 206l spaced by the distance SY1 from the convergent light spot 9a toward the + direction of the tangential direction Y.

When zero-order diffraction light of the first wavelength is incident on the second focus region B of the diffraction region 219, the zero-order diffraction light diffracted in the second focus region B is condensed, as a convergent light spot 9c, on a location spaced by a distance of PX2 from the optical axis 34 for outgoing light from the first light emission point 32 of the light source 12 toward the + direction of the radial direction X. The distance PX2 is shorter than the distance PX1. A straight line, which extends in the tangential direction Y while passing through the location of the convergent light spot 9c spaced by the distance PX2 from the optical axis 34 for outgoing light from the first light emission point 32 of the light source 12 on the light-receiving surface of the light-receiving element 206, will be termed "second straight line L2". The convergent light spot 9c on the third light-receiving region 206c, which results from diffraction of the first-wavelength light in the second focus region B, is slightly larger in spot shape than the convergent light spot 9a on the boundary between the first light-receiving region 206a and the second light-receiving region 206b, which results from diffraction of the first-wavelength light in the first focus region A.

When negative first-order diffraction light of the first wavelength produced by the light-dividing element 46 is incident on the second focus region B of the diffraction region 219, the negative first-order diffraction light diffracted in the second focus region B is condensed on a location within the eleventh light-receiving region 206k spaced by the distance SY1 from the convergent light spot 9c, which results from zero-order diffraction in the second focus region B, toward the − direction of the tangential direction Y. When positive first-order diffraction light of the first wavelength produced by the light-dividing element 46 is incident on the second focus region B, the positive first-order diffraction light diffracted in the second focus region B is condensed on a location within the twelfth light-receiving region 206l spaced by the distance SY1 from the convergent light spot 9c, which results from zero-order diffraction in the second focus region B, toward the + direction of the tangential direction Y. The shape of each of the resultant convergent light spots is slightly larger than the shape of the convergent light spot 9a.

When zero-order diffraction light of the first wavelength is incident on the third focus region C of the diffraction region 219, the zero-order diffraction light diffracted in the third focus region C is condensed, as a convergent light spot 9c2, on a location spaced by a distance of PX2a from the optical axis 34 for outgoing light from the first light emission point 32 of the light source 12 toward the + direction of the radial direction X. The distance PX2a is shorter than the distance PX2. A straight line, which extends in the tangential direction Y while passing through the location of the convergent light spot 9c2 spaced by the distance PX2a from the optical axis 34 for outgoing light from the first light emission point 32 of the light source 12 on the light-receiving surface of the light-receiving element 206, will be termed "fourth straight line L2a". The convergent light spot 9c2 resulting from diffraction of the first-wavelength light in the third focus region C is slightly larger in spot shape than the convergent light spot 9c on the third light-receiving region 206c, which results from diffraction of the first-wavelength light in the second focus region B.

When negative first-order diffraction light of the first wavelength produced by the light-dividing element 46 is incident on the third focus region C of the diffraction region 219, the negative first-order diffraction light diffracted in the third focus region C is condensed on a location spaced by the distance SY1 from the convergent light spot 9c2, which results from zero-order diffraction in the third focus region C, toward the − direction of the tangential direction Y. When positive first-order diffraction light of the first wavelength produced by the light-dividing element 46 is incident on the third focus region C, the positive first-order diffraction light diffracted in the third focus region C is condensed on a location spaced by the distance SY1 from the convergent light spot 9c2, which results from zero-order diffraction in the third focus region C, toward the + direction of the tangential direction Y.

The shape of each of the resultant convergent light spots is slightly larger than the shape of the convergent light spot 9c. That is, as for the sizes of the convergent light spot 9c and the convergent light spot 9c2 relative to the size of the convergent light spot 9a of zero-order diffraction light of the first wavelength, a relationship of the convergent light spot 9a the convergent light spot 9c the convergent light spot 9c2 can be employed. A similar relationship holds true for the sizes of the convergent light spots of ±first-order diffraction light of the first wavelength. It is noted that, although not shown in the drawings, the convergent light spots of positive first-order diffraction light located toward the +Y direction are larger in spot shape than their corresponding ones of the convergent light spots of zero-order diffraction light. On the other hand, the convergent light spots of negative first-order diffraction light located toward the −Y direction are smaller in spot shape than their corresponding ones of the convergent light spots of zero-order diffraction light.

Likewise, in the tracking diffraction region 236, when zero-order diffraction light of the first wavelength produced by the light-dividing element 46 is incident on the first first-type tracking region E1, the zero-order diffraction light diffracted in the first first-type tracking region E1 is condensed, as a convergent light spot 9e in a dot or nearly dot form, on a location spaced by the distance PX1 from the optical axis 34 for outgoing light from the first light emission point 32 of the light source 12 toward the + direction of the radial direction X, as well as spaced by a distance of PY toward the − direction of the tangential direction Y. When zero-order diffraction light of the first wavelength produced by the light-dividing element 46 is incident on the first second-type tracking region F1, the zero-order diffraction light diffracted in the first second-type tracking region F1 is condensed, as a convergent light spot 9f in a dot or nearly dot form, on a location spaced by the distance PX1 from the optical axis 34 for outgoing light from the first light emission point 32 of the light source 12 toward the + direction of the radial direction X, as well as spaced by the distance PY toward the + direction of the tangential direction Y. Where the relationship between the pitch of diffraction grooves and the diffraction angle is concerned, formulae similar to those that have already been described in connection with the first and second focus regions A and B hold true. Therefore, the description thereof will be omitted to avoid overlap.

When negative first-order diffraction light of the first wavelength produced by the light-dividing element 46 is incident on the first first-type tracking region E1, the negative first-order diffraction light diffracted in the first first-type tracking region E1 is condensed on a location within the seventh light-receiving region 206g spaced by the distance SY1 from the convergent light spot 9e, which results from zero-order diffraction in the first first-type tracking region E1, toward the − direction of the tangential direction Y. When positive first-order diffraction light of the first wavelength produced by the light-dividing element 46 is incident on the first first-type tracking region E1, the positive first-order diffraction light diffracted in the first first-type tracking region E1 is condensed, in a dot or nearly dot form, on a location within the ninth light-receiving region 206i spaced by the distance SY1 from the convergent light spot 9e, which results from zero-order diffraction in the first first-type tracking region E1, toward the + direction of the tangential direction Y.

When negative first-order diffraction light of the first wavelength produced by the light-dividing element 46 is incident on the first second-type tracking region F1, the negative first-order diffraction light diffracted in the first second-type tracking region F1 is condensed on a location within the eighth light-receiving region 206h spaced by the distance SY1 from the convergent light spot 9f, which results from zero-order diffraction in the first second-type tracking region F1, toward the − direction of the tangential direction Y. When positive first-order diffraction light of the first wavelength produced by the light-dividing element 46 is incident on the first second-type tracking region F1, the positive first-order diffraction light diffracted in the first second-type tracking region F1 is condensed, in a dot or nearly dot form, on a location within the tenth light-receiving region 206j spaced by the distance SY1 from the convergent light spot 9f, which results from zero-order diffraction in the first second-type tracking region F1, toward the + direction of the tangential direction Y.

When zero-order diffraction light of the first wavelength produced by the light-dividing element 46 is incident on the second first-type tracking region E2, the zero-order diffraction light diffracted in the second first-type tracking region E2 is condensed, as a convergent light spot 9e2, on a location spaced by the distance PX2 from the optical axis 34 for outgoing light from the first light emission point 32 of the light source 12 toward the + direction of the radial direction X, as well as spaced by the distance PY toward the − direction of the tangential direction Y. The distance PX2 is shorter than the distance PX1. The convergent light spot 9e2 is provided on the second straight line L2. The convergent light spot 9e2 resulting from diffraction in the second second-type tracking region F2 is slightly larger in spot shape than the convergent light spot 9e on the fifth light-receiving region 206e, which results from diffraction in the first first-type tracking region E1.

When zero-order diffraction light of the first wavelength produced by the light-dividing element 46 is incident on the second second-type tracking region F2, the zero-order diffraction light diffracted in the second second-type tracking region F2 is condensed, as a convergent light spot 9f2, on a location spaced by the distance PX2 from the optical axis 34 for outgoing light from the first light emission point 32 of the light source 12 toward the + direction of the radial direction X, as well as spaced by the distance PY toward the + direction of the tangential direction Y. The convergent light spot 9f2 is provided on the second straight line L2. The convergent light spot 9f2 resulting from diffraction in the second second-type tracking region F2 is slightly larger in spot shape than the convergent light spot 9f on the sixth light-receiving region 206f, which results from diffraction in the first second-type tracking region F1.

When zero-order diffraction light of the first wavelength produced by the light-dividing element 46 is incident on the third first-type tracking region E3, the zero-order diffraction light diffracted in the third first-type tracking region E3 is condensed, as a convergent light spot 9e2a, on a location spaced by the distance PX2a from the optical axis 34 for outgoing light from the first light emission point 32 of the light source 12 toward the + direction of the radial direction X, as well as spaced by the distance PY toward the − direction of the tangential direction Y. The distance PX2a is shorter than the distance PX2. The convergent light spot 9e2a is provided on the fourth straight line L2a. The convergent light spot 9e2a resulting from diffraction in the third second-type tracking region F3 is slightly larger in spot shape than the convergent light spot 9e2 on the fifth light-receiving region 206e, which results from diffraction in the second first-type tracking region E2.

When zero-order diffraction light of the first wavelength produced by the light-dividing element 46 is incident on the third second-type tracking region F3, the zero-order diffraction light diffracted in the third second-type tracking region F3 is condensed, as a convergent light spot 9f2c, on a location spaced by the distance PX2a from the optical axis 34 for outgoing light from the first light emission point 32 of the light source 12 toward the + direction of the radial direction X, as well as spaced by the distance PY toward the + direction of the tangential direction Y. The convergent light spot 9f2c is provided on the fourth straight line L2a. The convergent light spot 9f2c resulting from diffraction in the third second-type tracking region F3 is slightly larger in spot shape than the convergent light spot 9f2 on the sixth light-receiving region 206f, which results from diffraction in the second second-type tracking region F2.

As shown in FIG. 9, when zero-order diffraction light of the second wavelength is incident on the second focus region B of the diffraction region 219, the zero-order diffraction light diffracted in the second focus region B is condensed, as a convergent light spot 9a, on a location spaced by the distance PX1 from the optical axis 34 for outgoing light from the first light emission point 32 of the light source 12 toward the + direction of the radial direction X. The location of the convergent light spot 9a is the same as the location of the convergent light spot 9a of the first-wavelength light as described previously, namely the location of convergence of the zero-order diffraction light of the first wavelength diffracted in the first focus region A, which is spaced by the distance PX1 from the optical axis 34 for outgoing light from the first light emission point 32 of the light source 12 toward the + direction of the radial direction X. Accordingly, the angle of diffraction of the first-wavelength light at a given point on the parallel dividing line 27 in the first focus region A and the angle of diffraction of the second-wavelength light at the same given point on the parallel dividing line 27 in the second focus region B are set at the same value.

When zero-order diffraction light of the second wavelength is incident on the first focus region A of the diffraction region 219, the zero-order diffraction light diffracted in the first focus region A is condensed, as a convergent light spot 9d, on a location spaced by a distance of PX3 from the optical axis 34 for outgoing light from the first light emission point 32 of the light source 12 toward the + direction of the radial direction X. The distance PX3 is longer than the distance PX1. A straight line, which extends in the tangential direction Y while passing through the location of the convergent light spot 9d spaced by the distance PX3 from the optical axis 34 for outgoing light from the first light emission point 32 of the light source 12 on the light-receiving surface of the light-receiving element 206, will be termed "third straight line L3". On the light-receiving surface of the light-receiving element 206, the third straight line L3 passes through the fourth light-receiving region 206d.

When zero-order diffraction light of the second wavelength produced by the light-dividing element 46 is incident on the second first-type tracking region E2 of the diffraction region 219, the zero-order diffraction light diffracted in the second first-type tracking region E2 is condensed, as a convergent light spot 9e in a dot or nearly dot form, on a location spaced by the distance PX1 from the optical axis 34 for outgoing light from the first light emission point 32 of the light source 12 toward the + direction of the radial direction X, as well as spaced by the distance PY toward the − direction of the tangential direction Y. When zero-order diffraction light of the second wavelength produced by the light-dividing element 46 is incident on the second second-type tracking region F2, the zero-order diffraction light diffracted in the second second-type tracking region F2 is condensed, as a convergent light spot 9f in a dot or nearly dot form, on a location spaced by the distance PX1 from the optical axis 34 for outgoing light from the first light emission point 32 of the light source 12 toward the + direction of the radial direction X, as well as spaced by the distance PY toward the + direction of the tangential direction Y. Where the relationship between the pitch of diffraction grooves and the diffraction angle is concerned, formulae similar to those that have already been described in connection with the first and second focus regions A and B hold true. Therefore, the description thereof will be omitted to avoid overlap.

When negative first-order diffraction light of the second wavelength produced by the light-dividing element 46 is incident on the second first-type tracking region E2, the negative first-order diffraction light diffracted in the second first-type tracking region E2 is condensed on a location within the seventh light-receiving region 206g spaced by a distance of SY2 from the convergent light spot 9e, which results from zero-order diffraction in the first first-type tracking region E1, toward the − direction of the tangential direction Y. When positive first-order diffraction light of the second wavelength produced by the light-dividing element 46 is incident on the second first-type tracking region E2, the positive first-order diffraction light diffracted in the second first-type tracking region E2 is condensed, in a dot or nearly dot form, on a location within the ninth light-receiving region 206i spaced by the distance SY2 from the convergent light spot 9e, which results from zero-order diffraction in the first first-type tracking region E1, toward the + direction of the tangential direction Y. The distance SY2 is longer than the distance SY, because the second wavelength is longer than the first wavelength, and thus the angle of diffraction of ±first-order diffraction light of the second wavelength produced by the light-dividing element 46 is larger than that of ±first-order diffraction light of the first wavelength.

When negative first-order diffraction light of the second wavelength produced by the light-dividing element 46 is incident on the second second-type tracking region F2, the negative first-order diffraction light diffracted in the second second-type tracking region F2 is condensed on a location within the eighth light-receiving region 206h spaced by the distance SY2 from the convergent light spot 9f, which results from zero-order diffraction in the second second-type tracking region F2, toward the – direction of the tangential direction Y. When positive first-order diffraction light of the second wavelength produced by the light-dividing element 46 is incident on the second second-type tracking region F2, the positive first-order diffraction light diffracted in the second second-type tracking region F2 is condensed, in a dot or nearly dot form, on a location within the tenth light-receiving region 206j spaced by the distance SY2 from the convergent light spot 9f, which results from zero-order diffraction in the second second-type tracking region F2, toward the + direction of the tangential direction Y.

When zero-order diffraction light of the second wavelength produced by the light-dividing element 46 is incident on the first first-type tracking region E1, the zero-order diffraction light diffracted in the first first-type tracking region E1 is condensed, as a convergent light spot 9e3, on a location of the fifth light-receiving region 206e spaced by the distance PX3 from the optical axis 34 for outgoing light from the first light emission point 32 of the light source 12 toward the + direction of the radial direction X, as well as spaced by the distance PY toward the – direction of the tangential direction Y. The convergent light spot 9e3 resulting from diffraction in the first first-type tracking region E1 is slightly larger in spot shape than the convergent light spot 9e on the fifth light-receiving region 206e, which results from diffraction in the second first-type tracking region E2.

When zero-order diffraction light of the second wavelength produced by the light-dividing element 46 is incident on the first second-type tracking region F1, the zero-order diffraction light diffracted in the first second-type tracking region F1 is condensed, as a convergent light spot 9f3, on a location of the sixth light-receiving region 206f spaced by the distance PX3 from the optical axis 34 for outgoing light from the first light emission point 32 of the light source 12 toward the + direction of the radial direction X, as well as spaced by the distance PY toward the + direction of the tangential direction Y. The convergent light spot 9f3 resulting from diffraction in the first second-type tracking region F1 is slightly larger in spot shape than the convergent light spot 9f on the sixth light-receiving region 206f, which results from diffraction in the second second-type tracking region F2.

When zero-order diffraction light of the second wavelength produced by the light-dividing element 46 is incident on the third first-type tracking region E3, the zero-order diffraction light diffracted in the third first-type tracking region E3 is condensed, as a convergent light spot 9e2, on a location of the fifth light-receiving region 206e spaced by the distance PX3 from the optical axis 34 for outgoing light from the first light emission point 32 of the light source 12 toward the + direction of the radial direction X, as well as spaced by the distance PY toward the – direction of the tangential direction Y. The convergent light spot 9e2 resulting from diffraction in the third first-type tracking region E3 is slightly larger in spot shape than the convergent light spot 9e on the fifth light-receiving region 206e, which results from diffraction in the second first-type tracking region E2.

When zero-order diffraction light of the second wavelength produced by the light-dividing element 46 is incident on the third second-type tracking region F3, the zero-order diffraction light diffracted in the third second-type tracking region F3 is condensed, as a convergent light spot 9f2, on a location of the sixth light-receiving region 206f spaced by the distance PX2b from the optical axis 34 for outgoing light from the first light emission point 32 of the light source 12 toward the + direction of the radial direction X, as well as spaced by the distance PY toward the + direction of the tangential direction Y. The convergent light spot 9f2 resulting from diffraction in the third second-type tracking region F3 is slightly larger in spot shape than the convergent light spot 9f on the sixth light-receiving region 206f, which results from diffraction in the first second-type tracking region F1.

As shown in FIG. 10, when zero-order diffraction light of the third wavelength is incident on the third focus region C of the diffraction region 219, the zero-order diffraction light diffracted in the third focus region C is condensed, as a convergent light spot 9a, on a location spaced by the distance PX1 from the optical axis 34 for outgoing light from the first light emission point 32 of the light source 12 toward the + direction of the radial direction X. The location of the convergent light spot 9a is the same as the location of the convergent light spot 9a of the first-wavelength light as described previously, namely the location of convergence of the zero-order diffraction light of the first wavelength diffracted in the first focus region A, which is spaced by the distance PX1 from the optical axis 34 for outgoing light from the first light emission point 32 of the light source 12 toward the + direction of the radial direction X. Accordingly, the angle of diffraction of the first-wavelength light at a given point on the parallel dividing line 27 in the first focus region A, the angle of diffraction of the second-wavelength light at the same given point on the parallel dividing line 27 in the second focus region B, and the angle of diffraction of the third-wavelength light at the same given point on the parallel dividing line 27 in the third focus region C are set at the same value.

When zero-order diffraction light of the third wavelength is incident on the second focus region B of the diffraction region 219, the zero-order diffraction light diffracted in the second focus region B is condensed, as a convergent light spot 9d, on a location of the fourth light-receiving region 206d spaced by a distance of PX3b from the optical axis 34 for outgoing light from the first light emission point 32 of the light source 12 toward the + direction of the radial direction X. The distance PX3b is longer than the distance PX1. The convergent light spot 9d is provided on the third straight line L3. On the light-receiving surface of the light-receiving element 206, the third straight line L3 passes through the fourth light-receiving region 206d.

When zero-order diffraction light of the third wavelength produced by the light-dividing element 46 is incident on the third first-type tracking region E3 of the diffraction region 219, the zero-order diffraction light diffracted in the third first-type tracking region E3 is condensed, as a convergent light spot 9e in a dot or nearly dot form, on a location spaced by the distance PX1 from the optical axis 34 for outgoing light from the first light emission point 32 of the light source 12 toward the + direction of the radial direction X, as well as spaced by the distance PY toward the – direction of the tangential direction Y. When zero-order diffraction light of the third wavelength produced by the light-dividing element 46 is incident on the third second-type tracking region F3, the zero-order diffraction light diffracted in the third second-type tracking region F3 is condensed, as a convergent light spot 9f in a dot or nearly dot form, on a location spaced by the distance PX1 from the optical axis 34 for outgoing light from the first light emission point 32 of the light source 12 toward the + direction of the radial direction X, as well as spaced by the distance PY toward the + direction of the tangential direction Y. Where the relationship between the pitch of diffraction grooves and the diffraction angle is concerned, formulae similar to those that have already been described in connection with the first and second focus regions A and B hold true. Therefore, the description thereof will be omitted to avoid overlap.

When negative first-order diffraction light of the third wavelength produced by the light-dividing element 46 is incident on the third first-type tracking region E3, the negative first-order diffraction light diffracted in the third first-type tracking region E3 is condensed on a location within the seventh light-receiving region 206g spaced by a distance of SY3 from the convergent light spot 9e, which results from zero-order diffraction in the first first-type tracking region E1, toward the − direction of the tangential direction Y. When positive first-order diffraction light of the third wavelength produced by the light-dividing element 46 is incident on the third first-type tracking region E3, the positive first-order diffraction light diffracted in the third first-type tracking region E3 is condensed, in a dot or nearly dot form, on a location within the ninth light-receiving region 206i spaced by the distance SY3 from the convergent light spot 9e, which results from zero-order diffraction in the third first-type tracking region E3, toward the + direction of the tangential direction Y. The distance SY3 is shorter than the distance SY2, because the third wavelength is shorter than the second wavelength, and thus the angle of diffraction of ±first-order diffraction light of the third wavelength produced by the light-dividing element 46 is smaller than that of ±first-order diffraction light of the second wavelength.

When negative first-order diffraction light of the third wavelength produced by the light-dividing element 46 is incident on the third second-type tracking region F3, the negative first-order diffraction light diffracted in the third second-type tracking region F3 is condensed on a location within the eighth light-receiving region 206h spaced by the distance SY3 from the convergent light spot 9f, which results from zero-order diffraction in the third second-type tracking region F3, toward the − direction of the tangential direction Y. When positive first-order diffraction light of the third wavelength produced by the light-dividing element 46 is incident on the third second-type tracking region F3, the positive first-order diffraction light diffracted in the third second-type tracking region F3 is condensed, in a dot or nearly dot form, on a location within the tenth light-receiving region 206j spaced by the distance SY3 from the convergent light spot 9f, which results from zero-order diffraction in the third second-type tracking region F3, toward the + direction of the tangential direction Y.

When zero-order diffraction light of the third wavelength produced by the light-dividing element 46 is incident on the second first-type tracking region E2, the zero-order diffraction light diffracted in the second first-type tracking region E2 is condensed, as a convergent light spot 9e3, on a location of the fifth light-receiving region 206e spaced by the distance PX3b from the optical axis 34 for outgoing light from the first light emission point 32 of the light source 12 toward the + direction of the radial direction X, as well as spaced by the distance PY toward the − direction of the tangential direction Y. The convergent light spot 9e3 resulting from diffraction in the second first-type tracking region E2 is slightly larger in spot shape than the convergent light spot 9e on the fifth light-receiving region 206e, which results from diffraction in the third first-type tracking region E3.

When zero-order diffraction light of the third wavelength produced by the light-dividing element 46 is incident on the second second-type tracking region F2, the zero-order diffraction light diffracted in the second second-type tracking region F2 is condensed, as a convergent light spot 9f3, on a location of the sixth light-receiving region 206f spaced by the distance PX3b from the optical axis 34 for outgoing light from the first light emission point 32 of the light source 12 toward the + direction of the radial direction X, as well as spaced by the distance PY toward the + direction of the tangential direction Y. The convergent light spot 9f3 resulting from diffraction in the second second-type tracking region F2 is slightly larger in spot shape than the convergent light spot 9f on the sixth light-receiving region 206f, which results from diffraction in the third second-type tracking region F3.

When zero-order diffraction light of the second wavelength produced by the light-dividing element 46 is incident on the first first-type tracking region E1, the zero-order diffraction light diffracted in the first first-type tracking region E1 is condensed, as a convergent light spot 9e4, on a location spaced by a distance of PX4 from the optical axis 34 for outgoing light from the first light emission point 32 of the light source 12 toward the + direction of the radial direction X, as well as spaced by the distance PY toward the − direction of the tangential direction Y. The distance PX4 is longer than the distance PX3b. The convergent light spot 9e4 resulting from diffraction in the first first-type tracking region E1 is slightly larger in spot shape than the convergent light spot 9e3 on the fifth light-receiving region 206e, which results from diffraction in the second first-type tracking region E2.

When zero-order diffraction light of the third wavelength produced by the light-dividing element 46 is incident on the first second-type tracking region F1, the zero-order diffraction light diffracted in the first second-type tracking region F1 is condensed, as a convergent light spot 9f4, on a location spaced by a distance of PX4 from the optical axis 34 for outgoing light from the first light emission point 32 of the light source 12 toward the + direction of the radial direction X, as well as spaced by the distance PY toward the − direction of the tangential direction Y. The convergent light spot 9f4 resulting from diffraction in the first second-type tracking region F1 is slightly larger in spot shape than the convergent light spot 9f3 on the sixth light-receiving region 206f, which results from diffraction in the second second-type tracking region F2.

As with the first embodiment, within each of the focus diffraction region 221 and the tracking diffraction region 236, there are provided the first wavelength-specific segmented regions, the second wavelength-specific segmented regions, and the third wavelength-specific segmented regions. Accordingly, a focus error signal FES, a tracking error signal TES, and a playback signal RF obtained from electric signals detected in the light-receiving element 206 can be detected on a wavelength-by-wavelength basis.

In the second embodiment, in the locations corresponding to the centers of the optical axes for individual light of different wavelengths incident on the diffraction region 219, the tracking determination dividing lines 401 to 403 are separated according to wavelengths; wherefore division is done with respect to a position conforming to substantially the center of a spot of light of each wavelength when viewed in the radial direction X. This makes it possible to strike a good signal balance between the electric signal Se and the electric signal Sf, and also between the electric signal (Sg+Sh) and the electric signal (Si+Sj), and thereby adopt the DPP method which differs from the method used for tracking servo control in the first embodiment. That is, TES can be calculated in accordance with the following formula (13). Wherein k represents a constant.

$$TES = (Se - Sf) - k\{(Sg + Sh) - (Si + Sj)\} \quad (13)$$

It will thus be seen that the optical pickup apparatus 210 is capable of performing tracking servo control with stability so that light can be condensed properly on a desired track of the optical recording medium 11.

In the first and second embodiments, servo signals are detected by utilizing positive first-order diffraction light from the diffraction region 19 or the diffraction region 219. However, this does not suggest any limitation. By way of another embodiment, first to twelfth light-receiving regions 6a to 6l similar to those as above described may be arranged also on the negative first-order diffraction-light side. In this construction, focus error signals FES can be detected by the double knife-edge method using both of positive first-order diffraction light and negative first-order diffraction light.

Moreover, it is possible to achieve detection of servo signals for tracking servo with the construction based on another embodiment. More specifically, when the tracking servo method for light of the first wavelength differs from that for light of the second embodiment, for example, assuming that the three-beam method is adopted for the tracking servo method for the second wavelength and other different method is adopted for the tracking servo method for the first wavelength. In this case, in the interest of prevention of lack of balance in tracking error signals under the three-beam method, which is an object of the technology, for the case with the second-wavelength light, servo-signal detection for tracking servo is effected by the construction based on the first or second embodiment, and, for the case with the first-wavelength light, servo-signal detection is effected by the construction based on another embodiment.

In the case of using the integrated unit composed of an integrated combination of the light source 12, the light-receiving element 6, and the diffractive element 16 or the integrated unit composed of an integrated combination of the light sources 12 and 51, the light-receiving element 206, and the diffractive element 216, namely so-called hologram laser unit, in contrast to the case where those components are not unitized, the optical pickup apparatus 10, 210 can be made compact. Also in this case, the same effects as attained in the preceding embodiments can be achieved.

Moreover, in the first and second embodiments, the focus segmented regions of the focus region 22, 222 and the tracking segmented regions of the tracking region 38, 238 are divided by a plurality of parallel dividing lines 27 that are arranged parallelly. However, it is sufficient only that the focus region 22, 222 segments as well as the tracking region 38, 238 segments corresponding to their respective ones of different types of light that is emitted by the light source 12 or the light sources 12 and 51 be periodically distributed over the entire range of the focus region 22, 222 as well as the tracking region 38, 238. For example, the division may be done by dividing lines extending radially while passing through the center point P0.

Moreover, it is advisable that there are provided a plurality of focus segmented regions as well as tracking segmented regions divided by the parallelly-arranged parallel dividing lines 27 in each of the different focus regions 22, 222 as well as tracking regions 38, 238. The minimum required number is two. The larger the number of segmented regions in each region is, the higher the uniformity of distributive arrangement of segmented regions is.

Moreover, although the above description as to the first and second embodiments deals with the case where the knife edge method is adopted for focus servo control and the DPP method is adopted for tracking servo control, this does not suggest any limitation. As with these embodiments, it is possible to apply a different design to the optical pickup apparatus so long as the diffractive element 16, 216 is employed, the astigmatic method or beam size method is adopted for focus servo control and the DPD method or three-beam method is adopted for tracking servo control, and a light-receiving element having light-receiving regions corresponding to the diffractive element 16, 216 is prepared.

Moreover, in the first and second embodiments, in order to adopt the knife edge method, the knife edge portion 26 serving as a knife edge is defined by a straight line passing through the center of the optical axis 34. However, this does not suggest any limitation. As with these embodiments, it is possible to apply a knife edge portion defined by a straight line passing through a point deviated from the center of the optical axis 34 or a curved line, so long as it is capable of functioning as a knife edge.

Moreover, in the first and second embodiments, the light-dividing element 46 produces three beams in each of the case with light of two different wavelengths and the case with light of three different wavelengths. However, its function is not limited to production of three beams in either case. It is possible to impart wavelength selectivity to the light-dividing element 46 so that three beams are produced only from light of a specific wavelength, and light of other wavelength is transmitted therethrough. Expressed differently, the light-dividing element 46 may be designed to produce three beams only from light of a specific wavelength and cause light of other wavelength to pass therethrough for use as one beam.

Moreover, in the first and second embodiments, the semiconductor laser serving as the light source 12, 51 and the light-receiving element 6, 206 are arranged in proximity to each other. However, the structure of the optical pickup apparatus is not so limited. As with these embodiments, it is possible to apply an optical pickup apparatus including a light-condensing lens, a light-receiving element, and an optical branching element such as a beam splitter, wherein outgoing light emitted from the semiconductor laser is reflected from the optical recording medium 11 and the resultant return light is, at some midpoint in its optical path, branched by the optical branching element to turn the light axis of the return light, so long as the diffractive element 16 of the first embodiment or the diffractive element 216 of the second embodiment is disposed in the range of the return-light optical path.

Thus, the light source 12 or the light sources 12 and 51 are capable of emitting two or more types of light having different wavelengths to be applied to the optical recording medium 11, 211 having a plurality of tracks. The light-receiving element 6, 206 has the focus light-receiving region 17 and the tracking light-receiving region. The focus light-receiving region converts received light into electric signals for controlling a focal point control of light emitted from the light source 12 or the light sources 12 and 51. The tracking light-receiving region converts received light into electric signals for exercising control in such a manner that light emitted from the light source 12 or the light sources 12 and 51 can be applied to a target track of the optical recording medium 11, 211. The diffractive element 16, 216 has the diffraction region 19, 219 divided into the focus diffraction region 21, 221 and the tracking diffraction region 36, 236. The focus diffraction region diffracts the reflected light 18, which results from reflection of light emitted from the light source 12 or the light sources 12 and 51 at the optical recording medium 11, 211, in a direction toward the focus light-receiving region 17. The tracking diffraction region diffracts the reflected light 18 in a direction toward the tracking light-receiving region.

Moreover, the focus diffraction region 21, 221 and the tracking diffraction region 36, 236 are each divided into segmented regions by the parallel dividing lines 27 defined by a plurality of parallelly-arranged straight lines. The segmented regions included in the focus diffraction region 21, 221 are composed of the focus segmented regions corresponding to different types of light that is emitted by the light source 12 or the light sources 12 and 51, and the focus segmented regions corresponding to different light are arranged adjacent to each other in an alternating order in a direction perpendicular to the parallel dividing line 27. The segmented regions included in the tracking diffraction region 36, 236 are composed of the tracking segmented regions corresponding to different types of light that is emitted by the light source 12 or the light sources 12 and 51, and the tracking segmented regions corresponding to different light are arranged adjacent to each other in an alternating order in a direction perpendicular to the parallel dividing line 27. The focus diffraction region 21, 221 includes the focus regions 22, 222 corresponding to different types of light that is emitted by the light source 12 or the light sources 12 and 51. The tracking diffraction region 36, 236 includes the tracking regions 38, 238 corresponding to different types of light that is emitted by the light source 12 or the light sources 12 and 51.

Moreover, each of the focus regions 22, 222 is composed of the focus segmented regions corresponding to light of the same type as that corresponding to the focus region 22, 222, and diffracts the reflected light 18 in a direction toward one and the same focus light-receiving region 17. Each of the tracking regions 38, 238 is composed of the tracking segmented regions corresponding to light of the same type as that corresponding to the tracking region 38, 238, and diffracts the reflected light 18 in a direction toward one and the same tracking light-receiving region. The focus segmented regions are each so arranged as to lie next to the tracking segmented region corresponding to light of the same type as that corresponding to the focus segmented region at the boundary between the focus diffraction region 21, 221 and the tracking diffraction region 36, 236.

Thus, the optical pickup apparatus 10, 210 allows the shared use of the focus light-receiving region 17 and the tracking light-receiving region for two or more types of light having different wavelengths. Moreover, the optical pickup apparatus 10, 210 is capable of performing tracking servo with stability by lessening inconsistency in intensity of sub beams incident on the focus region 22, 222 and the tracking region 38, 238 under the three-beam method. Accordingly, in the optical pickup apparatus 10, 210 corresponding to a plurality of different wavelengths, for the case with one of the wavelengths, lack of balance in tracking error signals under the three-beam method can be prevented, and, for the case with other wavelength, servo control is performed on the basis of tracking error signals under the DPD method or DPP method. Consequently, in either wavelength case, stable servo signals can be obtained.

Moreover, according to the technology, the diffraction region 19, 219 is divided into the focus diffraction region 21, 221 and the tracking diffraction region 36, 236 by the focus determination dividing line 26 defined by a straight line which is parallel to the recording surface 35 of the optical recording medium 11, 211 and is perpendicular to the direction of the tangent to the track of the optical recording medium 11, 211. The parallel dividing line 27 is inclined at a predetermined angle with respect to the focus determination dividing line 26. Accordingly, the optical pickup apparatus 10, 210 is able to suppress intrusion of noise into playback signals caused by foreign particles or dirt attached to the optical recording medium 11, 211.

Moreover, according to the technology, the predetermined angle falls in the range of 30 degrees or more and 150 degrees or less. Accordingly, the optical pickup apparatus 10, 210 is able to reproduce playback signals with stability by suppressing intrusion of noise into optical signals in the presence of pits, namely concavities and convexities on the optical recording medium 11, 211 during the rotation of the optical recording medium 11, 211.

Moreover, according to the technology, the above-stated segmented regions each have a plurality of diffraction grooves that are arranged parallelly and periodically. When a single segmented region is sectioned along an imaginary plane perpendicular to the respective diffraction grooves, the number of the diffraction grooves included in the imaginary plane is five or more. Thereby, in the optical pickup apparatus 10, 210, the number of the diffraction grooves of each of the focus segmented regions and the tracking segmented regions arranged in a direction perpendicular to the diffraction grooves can be set at a necessary minimum value or more required for efficient diffraction. Accordingly, the optical pickup apparatus 10, 210 is able to achieve diffraction in each of the focus segmented regions and the tracking segmented regions with high efficiency.

Moreover, according to the technology, the tracking light-receiving region includes the first tracking light-receiving region, for example, the fifth light-receiving region 6e, 206e, and the second tracking light-receiving region disposed in a location different from the location of the first tracking light-receiving region, for example, the sixth light-receiving region 6f, 206f. The tracking segmented regions includes at least one of the first diffraction region for diffracting part of the reflected light 18 in a direction toward the first tracking light-receiving region (the fifth light-receiving region 6e, 206e, for example), for example, the first tracking region E, and the second diffraction region for diffracting part of the reflected light 18 in a direction toward the second tracking light-receiving region, for example, the second tracking region F. The first diffraction region as well as the second diffraction region included in one and the same tracking segmented region is divided by at least one tracking determination dividing line 40 defined by a straight line parallel to the direction of the tangent to the track of the optical recording medium 11, 211. The arrangement position of each tracking determination dividing line 40 is determined according to a type of light corresponding to the tracking segmented region.

Thus, in the optical pickup apparatus 10, 210, even if a plurality of light sources 12 or a plurality of light sources 12 and 51 take different positions, this does not tip the balance of intensity of light incident on the first tracking light-receiving region (the fifth light-receiving region 6e, 206e, for example) and the second tracking light-receiving region (the sixth light-receiving region 6f, 206f, for example) more toward one side, namely either of the first tracking light-receiving region (the fifth light-receiving region 6e, 206e, for example) and the second tracking light-receiving region (the sixth light-receiving region 6f, 206f, for example). Accordingly, the optical pickup apparatus 10, 210 is able to perform tracking servo with high accuracy.

Further, according to the technology, the tracking light-receiving region includes a plurality of light-receiving regions for receiving light diffracted in each of the tracking regions 38, 238 selectively in accordance with a type of light that is emitted by the light source 12 or the light sources 12 and 51, for example, the fifth to twelfth light-receiving regions 6e to 6l. Thereby, in the optical pickup apparatus 10, 210, the size of the tracking light-receiving region can be reduced. Accordingly, the optical pickup apparatus 10, 210 is able to achieve an increase in responsivity for tracking servo.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. An optical pickup apparatus comprising:
a light source capable of emitting two or more types of light having different wavelengths to be applied to an optical recording medium having a plurality of tracks;
a light-receiving element having a focus light-receiving region for converting received light into electric signals for controlling a focal point of light emitted from the light source, and a tracking light-receiving region for converting received light into electric signals for exercising control in such a manner that light emitted from the light source is applied to a target track of the optical recording medium; and
a diffractive element having a diffraction region divided into a focus diffraction region for diffracting reflected light which is emitted from the light source and then reflected by the optical recording medium, in a direction toward the focus light-receiving region, and a tracking diffraction region for diffracting the reflected light in a direction toward the tracking light-receiving region,
the focus diffraction region and the tracking diffraction region being divided into segmented regions by parallel dividing lines defined by a plurality of parallelly-arranged straight lines,
the segmented regions included in the focus diffraction region being composed of focus segmented regions corresponding to different types of light that is emitted by the light source, the focus segmented regions corresponding to different light being arranged adjacent to each other in an alternating order in a direction perpendicular to the parallel dividing line,
the segmented regions included in the tracking diffraction region being composed of tracking segmented regions corresponding to different types of light that is emitted by the light source, the tracking segmented regions corresponding to different light being arranged adjacent to each other in an alternating order in a direction perpendicular to the parallel dividing line,
the focus diffraction region including focus regions corresponding to different types of light that is emitted by the light source, the tracking diffraction region including tracking regions corresponding to different types of light that is emitted by the light source,
each of the focus regions being composed of focus segmented regions corresponding to light of a same type as that corresponding to the focus region, for diffracting the reflected light in a direction toward one and the same focus light-receiving region, each of the tracking regions being composed of tracking segmented regions corresponding to light of a same type as that corresponding to the tracking region, for diffracting the reflected light in a direction toward one and the same tracking light-receiving region,
each of the focus segmented regions being so arranged as to lie next to the tracking segmented region corresponding to light of a same type as that corresponding to the focus segmented region at a boundary between the focus diffraction region and the tracking diffraction region.

2. The optical pickup apparatus of claim 1, wherein the diffraction region is divided into the focus diffraction region and the tracking diffraction region by a first dividing line defined by a straight line which is parallel to a recording surface of the optical recording medium and is perpendicular to a direction of a tangent to the track of the optical recording medium, and
the parallel dividing line is inclined at a predetermined angle with respect to the first dividing line.

3. The optical pickup apparatus of claim 2, wherein the predetermined angle falls in a range of 30 degrees or more and 150 degrees or less.

4. The optical pickup apparatus of claim 2, wherein the segmented regions each have a plurality of diffraction grooves that are arranged parallelly and periodically, and
when a single segmented region is sectioned along an imaginary plane perpendicular to the respective diffraction grooves, a number of the diffraction grooves included in the imaginary plane is five or more.

5. The optical pickup apparatus of claim 1, wherein the tracking light-receiving region includes a first tracking light-receiving region and a second tracking light-receiving region disposed in a location different from the location of the first tracking light-receiving region,
each of the tracking segmented regions includes at least one of a first diffraction region for diffracting part of the reflected light in a direction toward the first tracking light-receiving region and a second diffraction region for diffracting part of the reflected light in a direction toward the second tracking light-receiving region,
the first diffraction region as well as the second diffraction region included in one and the same tracking segmented region is divided by at least one second dividing line defined by a straight line parallel to the direction of the tangent to the track of the optical recording medium, and
an arrangement position of each second dividing line is determined according to a type of light corresponding to the tracking segmented region.

6. The optical pickup apparatus of claim 5, wherein the tracking light-receiving region includes a plurality of light-receiving regions for receiving light diffracted in each of the tracking regions selectively in accordance with a type of light that is emitted by the light source.

* * * * *